US009118388B2

(12) United States Patent
Effenberger et al.

(10) Patent No.: US 9,118,388 B2
(45) Date of Patent: Aug. 25, 2015

(54) RAMAN CROSSTALK MITIGATION IN A MULTI-WAVELENGTH SYSTEM UTILIZING AN OPTICAL EQUALIZING SIGNAL MODULATED WITH COMPOSITE BANDWIDTH-LIMITED DATA SOURCES

(71) Applicant: Futurewei Technologies, Inc., Plano, TX (US)

(72) Inventors: Frank Effenberger, Bridgewater, NJ (US); Kerry I. Litvin, Huntingdon Valley, PA (US)

(73) Assignee: Futurewei Technologies, Inc., Plano, TX (US)

( * ) Notice: Subject to any disclaimer, the term of this patent is extended or adjusted under 35 U.S.C. 154(b) by 215 days.

(21) Appl. No.: 13/862,405

(22) Filed: Apr. 13, 2013

(65) Prior Publication Data
US 2014/0079395 A1 Mar. 20, 2014

Related U.S. Application Data

(60) Provisional application No. 61/623,827, filed on Apr. 13, 2012.

(51) Int. Cl.
*H04B 10/2537* (2013.01)
*H04B 3/32* (2006.01)
*H04B 10/2575* (2013.01)
(52) U.S. Cl.
CPC .............. *H04B 3/32* (2013.01); *H04B 10/2537* (2013.01); *H04B 10/25751* (2013.01)
(58) Field of Classification Search
CPC .................. H04B 10/2507; H04B 10/2537
See application file for complete search history.

(56) References Cited

U.S. PATENT DOCUMENTS 6,236,480 B1 * 5/2001 Atlas ................................ 398/9
7,271,948 B1 9/2007 Wang et al.
(Continued)

FOREIGN PATENT DOCUMENTS

EP 1755241 A1 2/2007
EP 1755241 A1 * 2/2007 ............. H04B 10/02

OTHER PUBLICATIONS

"IEEE Standard for Information Technology, Telecommunications and Information Exchange between Systems, Local and Metropolitan Area Networks, Specific Requirements, Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks," IEEE Computer Society, IEEE Std 802.3ah, Sep. 7, 2004, 640 pages.

(Continued)

*Primary Examiner* — Nathan Curs
(74) *Attorney, Agent, or Firm* — Conley Rose, P.C.; Grant Rodolph; Jonathan K. Polk

(57) ABSTRACT

A network element comprising a phase matched or phase controlled interconnect configured to receive a data signal sample, a Raman equalization transmitter, and a Raman crosstalk equalization conditioning circuit configured to generate a Raman mitigation signal using the data signal sample to be transmitted by the Raman equalization transmitter. Included is a method comprising multiplexing incoherent data signals with a video signal and a Raman mitigation signal to be co-propagated on a single optical fiber, wherein the Raman mitigation signal is selected to destructively interfere with Raman crosstalk noise induced on the video signal. Also included is a system comprising a video signal component configured to transmit a video signal, data stream signal components configured to transmit a data stream signals, a Raman crosstalk equalization system configured to transmit a Raman mitigation signal, and an optical multiplexer configured to multiplex the signals for co-propagation onto a single transmission fiber.

18 Claims, 9 Drawing Sheets

(56) References Cited

U.S. PATENT DOCUMENTS

| | | | |
|---|---|---|---|
| 7,783,197 B2 | 8/2010 | Litvin et al. | |
| 7,920,795 B2 | 4/2011 | Want et al. | |
| 8,923,696 B2* | 12/2014 | Stiscia et al. | 398/67 |
| 2006/0257148 A1 | 11/2006 | Hirth et al. | |
| 2007/0269212 A1* | 11/2007 | Remein et al. | 398/63 |
| 2009/0310967 A1* | 12/2009 | Wang et al. | 398/69 |

OTHER PUBLICATIONS

Kim, et al., "Performance Limitation of Hybrid WDM Systems Due to Stimulated Raman Scatterting," IEEE Photonics Technology Letters, vol. 13, No. 10, Oct. 2001, pp. 1118-1120.

Phillips, et al., "Crosstalk Due to Optical Fiber Nonlinearities in WDM CATV Lightwave Systems," Journal of Lightwave Technology, vol. 17, No. 10 Oct. 1999, pp. 1782-1792.

Foreign Communication From a Counterpart Application, PCT Application PCT/US2013/036508, International Search Report dated Jun. 18, 2013, 5 pages.

Foreign Communication From a Counterpart Application, PCT Application PCT/US2013/036508, Written Opinion dated Jun. 18, 2013, 9 pages.

Kim, H., et al., "Raman Crosstalk Suppression in CATV Overlay Passive Optical Network," IEEE Photonics Technology Letters, vol. 19, No. 9, May 1, 2007, pp. 695-697.

Coppinger, F., et al., "Nonlinear Raman Cross-Talk in a Video Overlay Passive Optical Network," Optical Fiber Communication Conference (OFC), Postconference Digest, Atlanta, Ga, Mar. 23-28, 2003, pp. 285-286.

\* cited by examiner

RAMAN CROSSTALK MITIGATION IN A MULTI-WAVELENGTH SYSTEM UTILIZING AN OPTICAL EQUALIZING SIGNAL MODULATED WITH COMPOSITE BANDWIDTH-LIMITED DATA SOURCES

CROSS-REFERENCE TO RELATED APPLICATIONS

The present application claims priority to U.S. Provisional Patent Application 61/623,827, filed Apr. 13, 2012 by Frank Effenberger, et al., and entitled "Raman Crosstalk Mitigation in a Multi-Wavelength System Utilizing an Optical Equalizing Signal Modulated with Composite Bandwidth-Limited Data Sources," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multi-point (P2MP) network comprised of an optical line terminal (OLT) at a central office, an optical distribution network (ODN), and a plurality of optical network units (ONUs) at a customer premises. Ethernet passive optical network (EPON) is a PON standard developed by the Institute of Electrical and Electronics Engineers (IEEE) and specified in IEEE 802.3ah, which is incorporated herein by reference. In EPON, a single fiber can be used for both the upstream and the downstream transmission with different wavelengths. Television video traffic may be co-propagated with baseband data streams signals through different wavelength optical signals in a shared single-fiber downstream path of an optical communication system. Raman crosstalk noise induced upon television channels may be concerning in such optical communication systems where one of the optical signals may be dedicated to the downstream transport of standard radio frequency (RF) subcarrier-multiplexed television video traffic while other co-propagating downstream signals may transport baseband data stream signals. For example, Raman crosstalk noise, if large enough, may severely degrade the quality of the video information being transmitted by the optical communication system.

SUMMARY

In one embodiment, the disclosure includes a network element comprising a phase matched interconnect or phase controlled interconnect configured to receive a data signal sample, a Raman equalization transmitter configured to transmit an optical Raman mitigation signal, and a Raman crosstalk equalization conditioning circuit configured to receive the data signal sample from the interconnect, generate a Raman mitigation signal using the data signal sample, and send a Raman mitigation signal to the Raman equalization transmitter.

In another embodiment, the disclosure includes a method comprising multiplexing a plurality of incoherent data signals with a video signal and a Raman mitigation signal and co-propagating the multiplexed signal on a single optical fiber, wherein the Raman mitigation signal is selected to destructively interfere with Raman crosstalk noise induced on the video signal by the incoherent data signals.

In another embodiment, the disclosure includes a system comprising a video signal component configured to transmit a video signal, a plurality of data stream signal components configured to transmit a data stream signals a Raman crosstalk equalization system configured to transmit a Raman mitigation signal, and an optical multiplexer (MUX) configured to multiplex the video signal, the data stream signals, and the Raman mitigation signal onto a single transmission fiber.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system, apparatus, and/or a method to mitigate Raman crosstalk noise induced onto a video signal co-propagating with a plurality of data signals through a single optical fiber. Such Raman crosstalk mitigation may be achieved by transmitting a Raman mitigation signal through the single optical fiber, which may create destructive interference with the Raman crosstalk noise. The Raman mitigation signal may be generated by modulating bandwidth limited samples of the data signals onto a Raman mitigation signal with a single equalizing optical transmitter. The equalizing optical transmitter may be capable of mitigating the Raman crosstalk noise of any number of co-propagating data signals. The Raman crosstalk mitigation may be effective for both incoherently and coherently related data signals. The Raman crosstalk mitigation may provide a 14 dB suppression of Raman crosstalk noise at a low frequency end of the video signal spectrum. The data signal samples used to generate the Raman mitigation signal may be taken from the data signals in either the electrical or optical frequency spectrum. Each data signal sample's amplitude and polarity may be conditioned to account for differences between the corresponding sampled data signal and the video signal.

Figure 1:
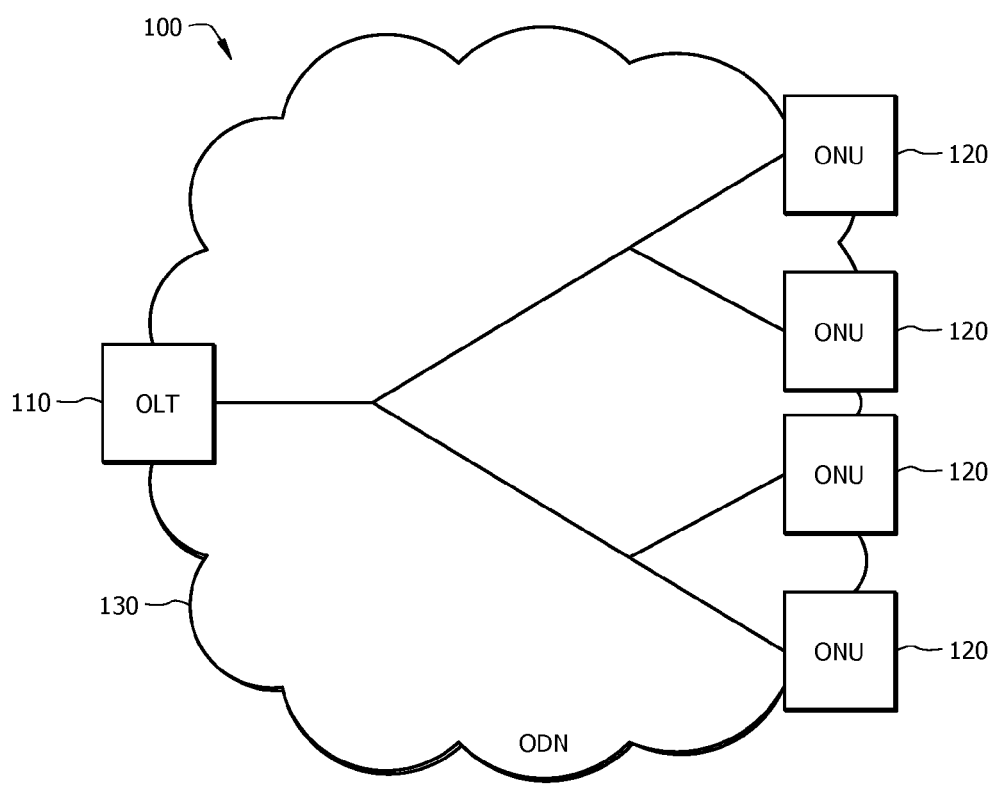
FIG. 1 is a schematic diagram of an embodiment of passive optical network (PON).

FIG. 1 is a schematic diagram of an embodiment of passive optical network (PON) 100. The PON 100 may comprise an OLT 110, a plurality of ONUs 120, and an optical distribution network (ODN) 130, which may be coupled to the OLT 110 and the ONUs 120. The PON 100 may be a communications network that may not require any active components to distribute data between the OLT 110 and the ONUs 120. Instead, the PON 100 may use the passive optical components in the ODN 130 to distribute data between the OLT 110 and the ONUs 120. In an embodiment, the PON 100 may be a Next Generation Access (NGA) system, such as a ten Gbps Gigabit-capable PON (XGPON), which may have a downstream bandwidth of about ten Gbps and an upstream bandwidth of at least about 2.5 Gbps. Alternatively, the PON 100 may be any Ethernet based network, such as an Ethernet PON (EPON) defined by the Institute of Electrical and Electronics Engineers (IEEE) 802.3ah standard, a 10 Gigabit EPON as defined by the IEEE 802.3av standard, an asynchronous transfer mode PON (APON), a broadband PON (BPON) defined by International Telecommunication Union-Telecommunication Standardization Sector (ITU-T) G.983 standard, a Gigabit-capable PON (GPON) defined by the ITU-T G.984 standard, or a wavelength division multiplexed (WDM) PON (WPON). All of these standards are incorporated herein by reference.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of active components, such as optical amplifiers. The ODN 130 may typically extend from the OLT 110 to the ONUs 120 in a branching configuration as shown in FIG. 1, but may be alternatively configured in any other point-to-multi-point configuration.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to a customer device. In some embodiments, ONUs 120 and optical network terminals (ONTs) are similar, and thus the terms are used interchangeably herein. The ONUs 120 may be typically located at distributed locations, such as the customer premises, but may be located at other locations as well.

Figure 2:
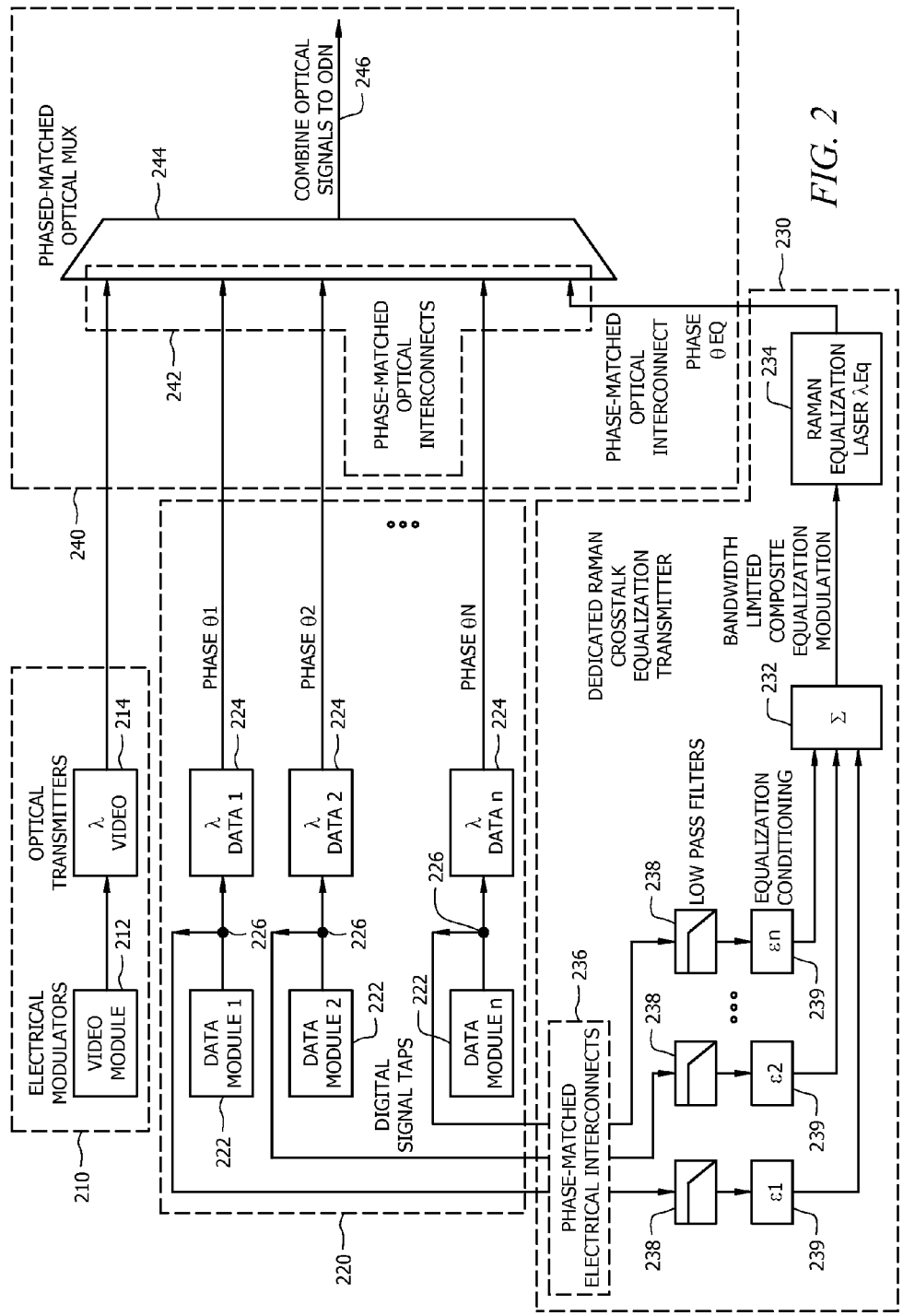
FIG. 2 is a schematic diagram of an embodiment of an optical system comprising a Raman crosstalk equalization system.

FIG. 2 is a schematic diagram of an embodiment of an optical system (e.g. PON 100) comprising a Raman crosstalk equalization system 200. FIG. 2 is a schematic diagram of an embodiment of an optical transmitter (e.g. OLT 110) apparatus employing a Raman crosstalk equalization system 200. System 200 may comprise a video signal component 210, a plurality of baseband data stream signal components 220, a Raman crosstalk equalization system 230, and a phase-matched optical multiplexer (MUX) 240. System 200 may output a multiplexed optical signal 246 comprising outputs from a video signal component 210 and the plurality of baseband data stream signal components 220 onto a single shared fiber of an optical data network (e.g. ODN 130). In system 200, the outputs from the plurality of baseband data stream signal components 220 may induce Raman crosstalk noise upon the output of the video signal component 210 while co-propagating on the single shared fiber of the ODN. System 200 may couple a Raman equalization optical signal onto the same single shared fiber of the ODN to mitigate the Raman crosstalk noise induced onto the output of the video signal component 210. The Raman equalization optical signal may comprise conditioned, bandwidth limited portions of each of the outputs of the data stream signal components 220. In system 200, a portion of the output of each data stream signal component 220 may be routed through the Raman crosstalk equalization system 230 and may be obtained prior to optical encoding in the data stream signal component 220. System 200 may use a plurality of low pass filters 238 in the Raman crosstalk equalization system 230 to limit the bandwidth of the data stream output portions. System 200 may use a plurality of Raman crosstalk equalization conditioning circuits 239 to condition the plurality of bandwidth limited portions. The conditioned bandwidth limited portions may be modulated together to create the Raman equalization optical signal.

A video signal component 210 may comprise a video stream modulator 212 and a video optical transmitter 214. A video bearing electrical stream may be applied to an input of a video stream modulator 212. The video stream modulator 212 may encode the video bearing electrical stream onto an intermediate video electrical signal. The intermediate video electrical signal may be output from the video modulator 212 to an input of a video optical transmitter 214. A video optical transmitter 214 may encode the intermediate video electrical signal onto a video optical signal at a specific wavelength. The video optical transmitter 214 may transmit the video optical signal into an optical fiber at an output of the video optical transmitter 214. The optical signal at the output of the video optical transmitter 214 may travel along the optical fiber to an input of a phase-matched optical MUX 240.

A plurality of baseband data stream signal components 220 may each comprise a data stream modulator 222, an electrical tap 226, and a data stream optical transmitter 224. A data bearing electrical stream may be applied to an input of each data stream modulator 222. Each data stream modulator 222 may encode the data bearing electrical stream onto an intermediate data stream signal. Each intermediate data stream signal may be routed to an electrical tap 226. Each electrical tap 226 may split the associated intermediate data stream signal, direct a portion of the intermediate data stream signal to a Raman crosstalk equalization system 230, and direct a portion of the intermediate data stream signal to a data stream optical transmitter 224. The data stream optical transmitter 224 may encode the intermediate data stream signal onto a data stream optical signal at a specific wavelength. The data stream optical transmitter 224 may couple the data stream optical signal into an optical fiber at an output of the data stream optical transmitter 224. The data stream optical signal at the output of the data stream optical transmitter 224 may travel along the optical fiber to an input of a phase-matched optical MUX 240.

A Raman crosstalk equalization system 230 may comprise a plurality of phase-matched electrical interconnections 236, a plurality of low pass filters 238, a plurality of Raman crosstalk equalization conditioning circuits 239, an electrical signal combiner 232, and a single Raman equalization optical transmitter 234. Each phase-matched electrical interconnection 236 may receive a portion of an intermediate data stream signal from a data stream modulator 222. The phase-matched electrical interconnection 236 may control a phasing of the portion of the intermediate data stream signal to ensure the phasing remains substantially similar from the output of the data stream modulator 222 to an input of a low pass filter 238.

Each low pass filter 238 may receive a portion of an intermediate data stream signal from a phase-matched electrical interconnection 236. The low pass filter 238 may limit the bandwidth of the intermediate data stream signal (e.g. according to a Raman crosstalk equalization method disclosed herein). For example, a low pass filter 238 may be designed with a cutoff frequency to mitigate Raman crosstalk effects in regions of a television (TV) RF frequency spectrum that may be affected more, such as 55-250 Megahertz (MHz). A bandwidth limited portion of the intermediate data stream signal may be routed from an output of the low pass filter 238 to an input of a Raman crosstalk equalization conditioning circuit 239. The Raman crosstalk equalization conditioning circuit 239 may condition a bandwidth limited portion of the intermediate data stream signal's amplitude and phase (e.g. according to an equalization weighting factor ($\epsilon_j$) disclosed herein). In an embodiment, electronic circuitry used to implement the Raman crosstalk equalization conditioning circuit 239 may be inherently bandwidth limited. In that embodiment, the Raman crosstalk equalization conditioning circuit 239 may also perform the low pass filtering function as a result of this characteristic of its natural behavior response. In that embodiment, there may not be a separate low pass filter in the Raman crosstalk equalization system 230 since the Raman crosstalk equalization conditioning circuit 239 may also be performing a low pass filtering function. The Raman crosstalk equalization conditioning circuit 239 may also substantially neutralize phase delays brought about by the low pass filtering process. Each Raman crosstalk equalization conditioning circuit 239 may route a conditioned, bandwidth limited portion of an intermediate data stream signal to an electrical signal combiner 232. The electrical signal combiner 232 may receive a plurality of conditioned, bandwidth limited portion intermediate data stream signals and combine them into a Raman equalization RF signal. The electrical signal combiner 232 may route the Raman equalization signal to an input of a single Raman equalization optical transmitter 234. The single Raman equalization optical transmitter 234 may convert the Raman equalization signal into an optical Raman mitigation signal and transmit the Raman equalization optical signal at specific wavelength(s). The single Raman equalization optical transmitter 234 may route the Raman equalization optical signal to an optically phase matched interconnection 242 of a phase-matched optical MUX 240.

A phase-matched optical MUX 240 may comprise a plurality of optically phase matched interconnections 242 and an optical multiplexing apparatus 244. Each optically phase matched interconnection 242 may receive a video optical signal, a plurality of data stream optical signals, and/or a Raman equalization optical signal via an input. Each optically phase matched interconnection 242 may ensure that a relative phasing of the video optical signal, the plurality of data stream optical signals, and/or the Raman equalization optical signal is maintained so that Raman equalization may occur. Each optically phase matched interconnection 242 may pass a phase matched video optical signal, a phase matched plurality of data stream optical signals, and/or a phase matched Raman equalization optical signal to an optical multiplexing apparatus 244 via an output. An optical multiplexing apparatus 244 may receive a phase matched video optical signal, a phase matched plurality of data stream optical signals, and a phase matched Raman equalization optical signal via an input. The optical multiplexing apparatus 244 may combine the video optical signal, the plurality of data stream optical signals, and the Raman equalization optical signal into a combined optical signal. The optical multiplexing apparatus 244 output may couple the combined optical signal onto a single shared fiber 246. The combined optical signal at the single shared fiber 246 may travel through an optical distribution network (e.g. ODN 130). The Raman equalization optical signal may be effective for both incoherently and coherently related data signals. Incoherently related data signals may be data signals that may be coming from unrelated sources. Coherently related data signals may be data signals that may be coming from a same source.

Figure 3:
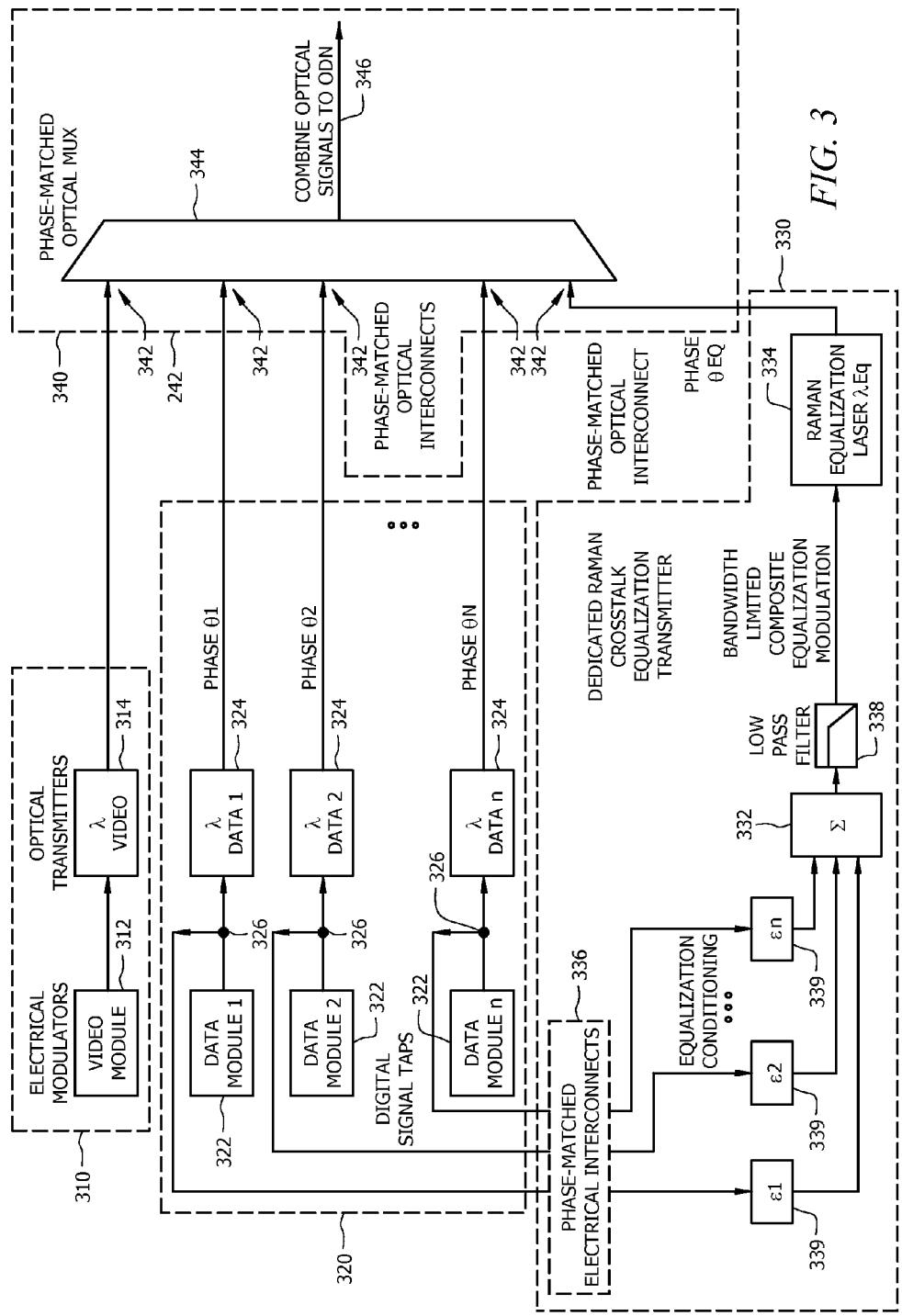
FIG. 3 is a schematic diagram of another embodiment of an optical system comprising a Raman crosstalk equalization system.

FIG. 3 is a schematic diagram of another embodiment of an optical system (e.g. PON 100) comprising a Raman crosstalk equalization system. System 300 may comprise a video signal component 310, a plurality of baseband data stream signal components 320, a Raman crosstalk equalization system 330, and a phase-matched optical MUX 340, which may be similar to video signal component 210, baseband data stream signal components 220, Raman crosstalk equalization system 230, and phase-matched optical MUX 240, respectively. The video signal component 310 may comprise a video stream modulator 312 and a video optical transmitter 314, which may be similar to video stream modulator 212 and video optical transmitter 214, respectively. The baseband data stream signal component 320 may comprise a plurality of data stream modulators 322, a plurality of electrical taps 326, and a plurality of data stream optical transmitters 324, which may be similar to the data stream modulators 222, the electrical taps 226, and the data stream optical transmitters 224, respectively. The Raman crosstalk equalization system 330 may comprise a Raman equalization optical transmitter 334, a plurality of phase-matched electrical interconnections 336, an electrical signal combiner 332, and a plurality of Raman crosstalk equalization conditioning circuits 339, which may be similar to Raman equalization optical transmitter 234, phase-matched electrical interconnections 236, electrical signal combiner 232, and Raman crosstalk equalization conditioning circuits 239, respectively. A phase-matched optical MUX 340 may comprise a plurality of optically phase matched interconnections 342, an optical multiplexing apparatus 344, and a shared output fiber 346, which may be similar to a plurality of optically phase matched interconnections 242, an optical multiplexing apparatus 244, and a shared output fiber 246, respectively.

System 300 may employ a single low pass filter 338 to provide bandwidth limited samples of the outputs of the data stream signal components 320. In system 300, the Raman crosstalk equalization conditioning circuits 339 may be used to condition the portions prior to passing through the single low pass filter 338. System 300 may replace the plurality of low pass filters 238 with a single low pass filter 338 following the electrical signal combiner 332, which may act simultaneously on all portions of the intermediate data stream signals in order to limit their bandwidths prior to being routed to a Raman equalization optical transmitter 334. In system 300, the Raman crosstalk equalization conditioning circuits 339 may need to operate over the full bandwidth of the intermediate data stream signals. Each intermediate data stream signal may be unfiltered at the input of each Raman crosstalk equalization conditioning circuit 339.

Figure 4:
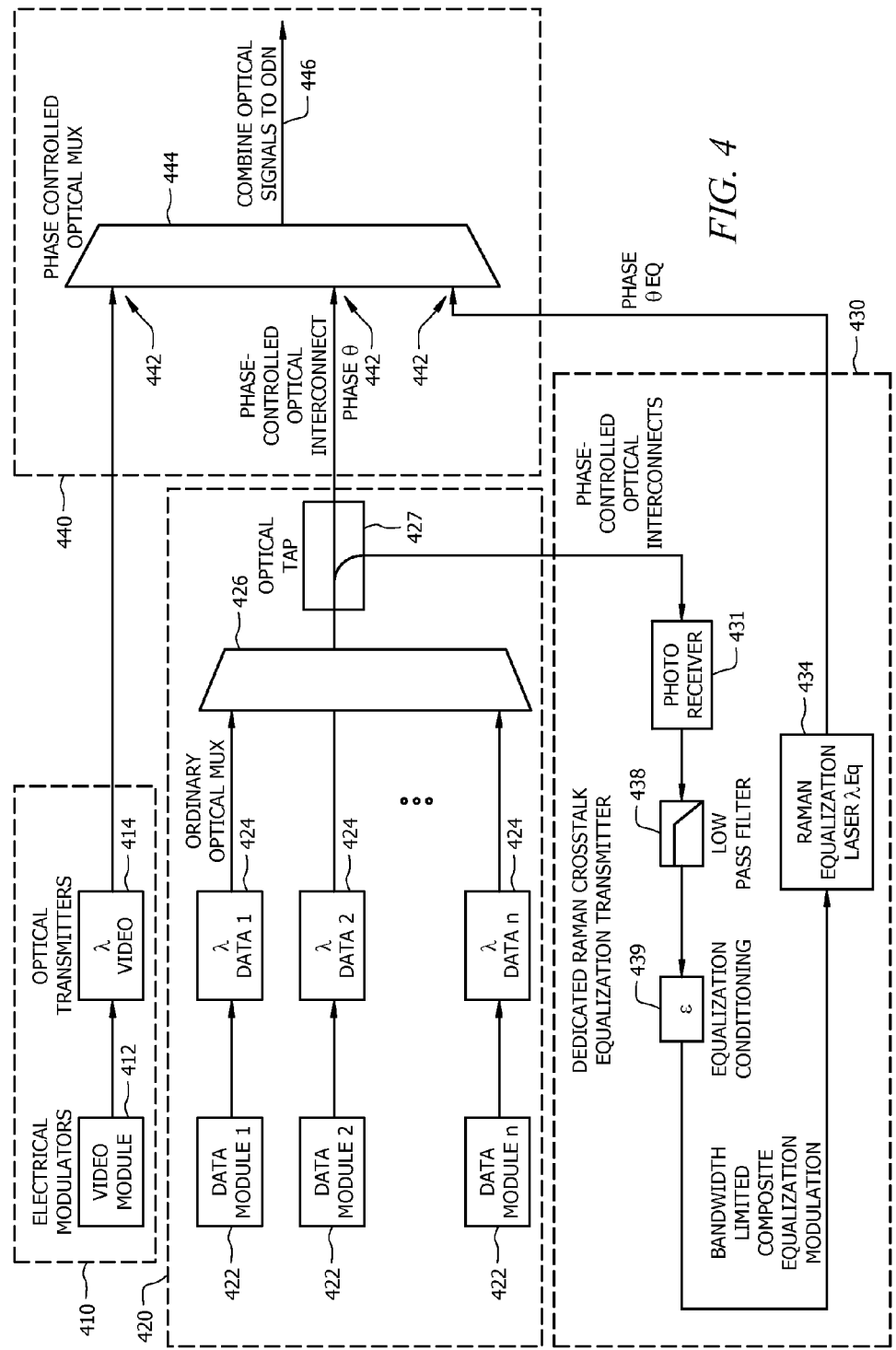
FIG. 4 is a schematic diagram of another embodiment of an optical system comprising a Raman crosstalk equalization system.

FIG. 4 is a schematic diagram of another embodiment of an optical system (e.g. PON 100) comprising a Raman crosstalk equalization system 400. System 400 may comprise a video signal component 410, a plurality of baseband data stream signal components 420, a Raman crosstalk equalization system 430, and a phase-matched optical multiplexer (MUX) 440, which may be similar to video signal component 210, baseband data stream signal components 220, Raman crosstalk equalization system 230, and phase-matched optical MUX 240, respectively. The video signal component 410 may comprise a video stream modulator 412 and a video optical transmitter 414, which may be similar to video stream modulator 212 and video optical transmitter 214, respectively. The baseband data stream signal component(s) 420 may comprise a plurality of data stream modulators 422 and a plurality of data stream optical transmitters 424, which may be similar to data stream modulators 222 and data stream optical transmitters 224, respectively. The phase-matched optical MUX 440 may comprise a plurality of optically phase matched interconnections 442, an optical multiplexing apparatus 444, and a shared output fiber 446, which may be similar to the optically phase matched interconnections 242, the optical multiplexing apparatus 244, and the single shared fiber 246, respectively.

The baseband data stream signal component 420 may further comprise an optical MUX 426 and an optical tap 427. The plurality of data stream optical transmitter 424 outputs may be routed to an input of the optical MUX 426. The optical MUX 426 may combine the plurality of data stream optical transmitter 424 outputs into a single aggregated data stream component optical output. The single aggregated data stream component optical output may be routed to an input of an optical tap 427. The optical tap 427 may split the single aggregated data stream component optical output into a plurality of aggregated optical portions. One aggregated optical portion may be routed to a phase-matched optical interconnection 436 of a Raman crosstalk equalization system 430. Another aggregated optical portion may be routed to an optically phase matched interconnection 442 of a phase-matched optical MUX 440.

The Raman crosstalk equalization system 430 may comprise a Raman equalization optical transmitter 434, a single low pass filter 438, and a single Raman crosstalk equalization conditioning circuit 439, which may be similar to Raman equalization optical transmitter 334, single low pass filter 338, and Raman crosstalk equalization conditioning circuit 339, respectively. A Raman crosstalk equalization system 430 may further comprise an optical receiver 431 and a phase-matched optical interconnection 436. The phase-matched optical interconnection 436 may receive the aggregated optical portion from the optical tap 427 and may output the phase-matched, aggregated optical portion to an optical receiver 431. The optical receiver 431 may convert the phase-matched, aggregated optical portion into a phase-matched, aggregated electrical signal. The optical receiver 431 may route the phase-matched, aggregated electrical signal to an input of a single low pass filter 438. The single low pass filter 438 may have a cutoff frequency determined according to an equalization weighting factor ($\epsilon_j$). The single low pass filter 438 may output a bandwidth limited, phase-matched aggregate electrical signal to an input of a Raman crosstalk equalization conditioning circuit 439. The Raman crosstalk equalization conditioning circuit 439 may condition the bandwidth limited aggregate electrical portion's amplitude and phase (according to an equalization weighting factor ($\epsilon_j$)). The Raman crosstalk equalization conditioning circuit 439 may also neutralize any phase delays brought about by the low pass filtering process. The Raman crosstalk equalization conditioning circuit 439 may output a conditioned, bandwidth limited, phase-matched aggregate electrical signal to an input of a Raman equalization optical transmitter 434. The Raman equalization optical transmitter 434 may encode the conditioned, bandwidth limited, phase-matched aggregate electrical portion onto a Raman equalization optical signal at a specific wavelength. The Raman equalization optical transmitter 434 may route the Raman equalization optical signal to an optically phase matched interconnection 442 of a phase-matched optical MUX 440.

System 400 may be a simplification over system 200 and system 300. In system 400, a plurality of electrical taps (e.g. plurality of electrical taps 226 and plurality of electrical tap 326) may be removed. Also, phase-matched electrical interconnections (e.g. plurality of phase-matched electrical interconnections 236 and plurality of phase-matched electrical interconnections 336) may be removed. The Raman equalization optical transmitter 434 may be electrically isolated from all other apparatus 400 transmitters, which may eliminate a need for any specialized tap ports to be built into any data transmitters. In system 400 there may be no direct way to separate the single aggregated data stream into a plurality of optical signals. Therefore, equalization conditioning may be applied simultaneously to the single aggregated data stream by a single Raman crosstalk equalization conditioning circuit 439. The electrical isolation of the transmitters in system 400 may provide simplification, but may also reduce the degrees of freedom, which may be afforded by applying separate equalization conditioning to each digital data stream signal. However, a compromise conditioning phase and amplitude adjustment may be applied, which may provide an acceptable coherent destructive interference given the reduction in the degrees of freedom. In system 400, the single Raman crosstalk equalization conditioning circuit 439 may also need to account for a signal delay through the optical receiver 431 as well as the single low pass filter's 438 phase response. System 400 may combine the data stream signals with the Raman equalization optical transmitter's 434 modulated output, and the video carrying optical signal in the phase-matched optical MUX 440. The combined data stream optical signals and Raman equalization optical signal may be connected to the phase-matched optical MUX 440 with phase controlled optical interconnections so phasing of these signals may be preserved. Preservation of phase may permit the intended coherent destructive interference to occur at the video carrier wavelength, which may greatly reduce Raman crosstalk noise. In system 400, the interfaces between the data stream optical signals and the Raman mitigation signal may be accomplished optically. Therefore, system 400 may be added to a system as an after-the-fact option on an as-needed basis. In this embodiment, an optical mux 426 may be placed in a baseband data stream signal component 420 to combine the baseband data stream signals and route such signals to the dedicated Raman crosstalk equalization system 430. There may be no need to have special electrical ports tapping modulation signals of the data stream signal transmitters. Thus, system 400 may be inserted to an optical communication system as desired.

Systems 200, 300, and/or 400 may curtail some contributions of Raman crosstalk noise on a video carrying optical signal within a radio frequency (RF) spectral region impacted by this phenomenon. The systems disclosed herein may provide a dedicated optical carrier that may be appropriately prepared by conditioning its wavelength and launch power. The dedicated optical carrier may also be modulated with a polarized composite yet bandwidth limited reproduction of a plurality of offending baseband data stream signals. The dedicated optical carrier may minimize deleterious Raman crosstalk noise and may restore the integrity of transmitted video information. In an optical communication system (e.g. PON 100) with several co-propagating modulated optical signals, Raman interactions may occur between the signals. For example, a wavelength, in an optical communication system may be pumped by other shorter wavelengths and may pump all longer wavelengths in the system. These pump-probe interactions (ignoring effects of chromatic dispersion) at time t and position L in an optical fiber may be defined by:

Equations 1-3

$$P_i(t,L) = P_i(t) e^{\sum_{j=1}^{n} H_{i,j} G_{i,j} \bar{\rho}_{L\ i,j} L_{eff} P_j(t) - \alpha_i L} \quad (1)$$

Where:
i=denotes a particular wavelength under consideration
j=denotes other wavelengths in an optical communication system
$P_i(t, L)$=an instantaneous power of $\lambda_i$ at time "t" and optical fiber distance "L"
$P_i(t)$=an instantaneous power of $\lambda_i$ at time "t"
$H_{i,j}$=a parameter accounting for $\lambda_i$ pumping a $j^{th}$ wavelength ($\lambda_j$) and being pumped by $\lambda_j$ defined by Equation 2
$G_{i,j}$=a Raman gain coefficient between $\lambda_i$ and $\lambda_j$ [Note $G_{i,i}$=0]
$\bar{\rho}_{L\ i,j}$=a length averaged polarization overlap probability between $\lambda_i$ and $\lambda_j$ defined by Equation 3
$L_{eff\ j}$=a nonlinear effective length in an optical fiber at $\lambda_j$
$P_j(t)$=an instantaneous power of $\lambda_j$
$\alpha_i$=a power attenuation factor in an optical fiber at $\lambda_i$ $$H_{i,j} \equiv \begin{cases} 1 & \lambda_i > \lambda_j \\ -1 \dfrac{\tilde{n}_i \lambda_i}{\tilde{n}_j \lambda_j} & \lambda_i < \lambda_j \end{cases} \quad (2)$$

Where:
$\tilde{n}_i$=an effective refractive index in an optical fiber at $\lambda_i$
$\tilde{n}_j$=an effective refractive index in an optical fiber at $\lambda_j$ $$\bar{\rho}_{Li,j} = \frac{1}{2}\left(1 + \frac{1}{L}\int_0^L S_i(x) \cdot S_j(x) dx\right) \quad (3)$$

Where:
$S_i(x)$=a position dependent Stokes vector of $\lambda_i$
$S_j(x)$=a position dependent Stokes vector of $\lambda_j$
·=denotes a vector dot product operation
$\bar{\rho}_{L\ i,j} = \bar{\rho}_{L\ j,i}$
$\bar{\rho}_{L\ i,i} = 1$ An expansion of the exponential in Equation 1 to a first order may be defined by:

Equations 4-6

$$P_i(t,L) = P_i(t)[1 + \sum_{j=1}^{n} H_{i,j} G_{i,j} \bar{\rho}_{L\ i,j} L_{eff} P_j(t)] e^{-\alpha_i L} \quad (4)$$

$$P_i(t) = P_{0i} + P_{0i} m_i f_i(t) \quad (5)$$

Where:
$P_{0i}$=an average optical launch power of $\lambda_i$ at x=0
$m_i$=an optical modulation index of $\lambda_i$
$f_i(t)$=a time dependent function representing modulation information of $\lambda_i$ $$P_j(t) = P_{0j} + P_{0j} m_j f_j(t) \quad (6)$$

Where:
$P_{0j}$=an average optical launch power of $\lambda_j$ at x=0
$m_j$=an OMI of $\lambda_j$
$f_j(t)$=a time dependent function representing modulation information of $\lambda_j$ Time dependent functions, $f_i(t)$ and $f_j(t)$, may represent modulation information carried by $\lambda_i$ and $\lambda_j$, respectively, with optical modulation indices (OMI) $m_i$ and $m_j$, respectively. If $f_i(t)$ and $f_j(t)$ are assumed to have a zero mean when averaged over time, $P_{oi}$ and $P_{oj}$ may be an average optical launch power of each optical signal at x=0. Substituting Equations 5 and 6 into Equation 4 may result in:

Equations 7

$$P_i(t, L) = \qquad (7)$$

$$P_i(t)e^{-\alpha_i L} + \sum_{j=1}^{n} H_{i,j} G_{i,j} \bar{\rho}_{L i,j} L_{\it{eff}j} P_j(t) P_i(t) e^{-\alpha_i L} = P_i(t) e^{-\alpha_i L} +$$

$$\sum_{j=1}^{n} H_{i,j} G_{i,j} \bar{\rho}_{L i,j} L_{\it{eff}j} P_{0i} P_{0j} \begin{bmatrix} 1 + m_i f_i(t) + \\ m_j f_j(t) m_i m_j f_i(t) f_j(t) \end{bmatrix} e^{-\alpha_i L}$$

The first term in Equation 7 may represent an original $\lambda_i$ without any Raman interaction. The terms within the summation in Equation 7 may represent first order Raman interaction effects resulting from modulated co-propagating signals. The first term within the brackets in Equation 7 may represent an overall Raman interaction gain (or loss) on an average optical signal power of $\lambda_i$ ($P_{oi}$). The second term within the brackets in Equation 7 may represent an overall Raman interaction gain (or loss) of $\lambda_i$'s modulation term. These first two Raman interaction terms may not necessarily be overtly deleterious so long as Raman crosstalk noise transfer from co-propagating signals is minimal. The third term may indicate Raman crosstalk noise, a transfer of $\lambda_j$'s modulation onto $\lambda_i$. Finally, the forth term may also represents a mixing (or second order crosstalk effect) where $\lambda_j$'s modulation may be multiplying $\lambda_i$'s modulation term. The fourth term may reduced by a product of the respective OMI's of $\lambda_i$ and $\lambda_j$.

Systems 200, 300, and/or 400 may mitigate the deleterious effects of a transfer of energy from $\lambda_j$ to $\lambda_i$ due to Raman crosstalk in an optical fiber. In other words, systems 200, 300, and/or 400 may mitigate the third and fourth terms within the brackets of Equation 7. Raman crosstalk mitigation may be realized by introducing an equalizing optical signal onto an optical fiber shared by video traffic optical signals and co-propagating baseband data stream signals carrying optical signals. An equalizing optical signal may be introduced by an additional transmitter dedicated to an equalization of Raman crosstalk effects at a wavelength $\lambda_E$. Introducing an equalizing optical signal $\lambda_E$ into Equation 1 results in:

Equation 8

$$P_i(t,L) = P_i(t) e^{[\Sigma_{j=1}^{n} H_{i,j} G_{i,j} \bar{\rho}_{L i,j} L_{\it{eff}j} P_j(t) + H_{i,E} G_{i,E} \bar{\rho}_{L i,E} L_{\it{eff}E} P_E(t) - \alpha_i L]} \qquad (8)$$

Where:

$H_{i,E}$=a parameter accounting for $\lambda_i$ pumping $\lambda_E$ and being pumped by $\lambda_E$ $G_{i,E}$=a Raman gain coefficient between $\lambda_i$ and $\lambda_E$ $\bar{\rho}_{L i,E}$=a length averaged polarization overlap probability between $\lambda_i$ and $\lambda_E$ $L_{\it{eff}E}$=a nonlinear effective length in an optical fiber at $\lambda_E$ $P_E(t)$=an instantaneous power of $\lambda_E$ If only first order expansion terms are retained Equation 8 may become:

Equation 9

$$P_i(t,L) = P_i(t) e^{-\alpha_i L} + \Sigma_{j=1}^{n} H_{i,j} G_{i,j} \bar{\rho}_{L i,j} L_{\it{eff}j} P_{0i} P_{0j} [1+m_i f_i(t) + m_j f_j(t) m_i m_j f_i(t) f_j(t)] e^{-\alpha_i L} + P_i(t) P_E(t) H_{i,E} G_{i,E} \bar{\rho}_{L i,E} L_{\it{eff}E} e^{-\alpha_i L} \qquad (39)$$

Where:

$P_{0j}$=an average optical launch power of $\lambda_j$ at x=0

$m_j$=an optical modulation index of $\lambda_j$ $f_j(t)$=a time dependent function representing modulation information of $\lambda_j$ Substituting Equations 5 and 6 into Equation 9 may result in:

Equation 10

$$P_i(t,L) = P_i(t) e^{-\alpha_i L} \{1 + \Sigma_{j=1}^{n} H_{i,j} G_{i,j} \bar{\rho}_{L i,j} L_{\it{eff}j} P_{0j} [1+m_j f_j(t)] + P_E(t) H_{i,E} G_{i,E} \bar{\rho}_{L i,E} L_{\it{eff}E}\} \qquad (10)$$

In order to significantly mitigate Raman crosstalk effects on $\lambda_i$ an equalizer signal may need to satisfy:

Equation 11

$$\Sigma_{j=1}^{n} H_{i,j} G_{i,j} \bar{\rho}_{L i,j} L_{\it{eff}j} P_{0j} [1+m_j f_j(t)] + P_E(t) H_{i,E} G_{i,E} \bar{\rho}_{L i,E} L_{\it{eff}E} = 0 \qquad (11)$$

The parameters $H_{i,E}$, $G_{i,E}$, and $L_{\it{eff},E}$ may be set by design parameters of $\lambda_E$. A length averaged polarization overlap probability $\bar{\rho}_{L, i,E}$ may be a function of a fiber polarization mode dispersion (PMD) and the wavelengths $\lambda_i$ and $\lambda_E$, which may vary. An equalizer modulation function ($P_E(t)$) may take the form of a composite modulation defined by:

Equation 12

$$P_E(t) = P_{0E}(1 + \Sigma_{j=1}^{n} \epsilon_j m_j f_j(t)) \qquad (12)$$

Where:

$P_{0E}$=an average optical launch power of $\lambda_E$ at x=0

$\epsilon_j$=an equalization weighting factor, which may be adjusted so that Equation 11 holds true Substituting Equation 5 and 6 into Equation 9 may result in:

Equation 13

$$\Sigma_{j=1}^{n} H_{i,j} G_{i,j} \bar{\rho}_{L i,j} L_{\it{eff}j} P_{0j} [1+m_j f_j(t)] = -P_{0E} (1 + \Sigma_{j=1}^{n} \epsilon_j m_j f_j(t)) H_{i,E} G_{i,E} \bar{\rho}_{L i,E} L_{\it{eff}E} \qquad (13)$$

Time dependent and time independent terms of Equation 13 may be separated, resulting in:

Equations 14 and 15

$$\Sigma_{j=1}^{n} H_{i,j} G_{i,j} \bar{\rho}_{L i,j} L_{\it{eff}j} P_{0j} = -H_{i,E} G_{i,E} \bar{\rho}_{L i,E} L_{\it{eff}E} P_{0E} \qquad (14)$$

$$\Sigma_{j=1}^{n} H_{i,j} G_{i,j} \bar{\rho}_{L i,j} L_{\it{eff}j} P_{0j} m_j f_j(t) = -P_{0E} \Sigma_{j=1}^{n} \epsilon_j m_j f_j(t) H_{i,E} G_{i,E} \bar{\rho}_{L i,E} L_{\it{eff}E} \qquad (15)$$

If modulation terms ($f_j(t)$) are presumed to be independent of one another, Equation 15 may hold true for every independent modulation term, resulting in:

Equation 16

$$H_{i,j} G_{i,j} \bar{\rho}_{L,i,j} L_{\it{eff}j} P_{0j} m_j f_j(t) = -P_{0E} \epsilon_j m_j f_j(t) H_{i,E} G_{i,E} \bar{\rho}_{L,i,E} L_{\it{eff}E} \qquad (16)$$

Solving Equation 16 for an equalizing weighting factor ($\epsilon_j$) may result in:

Equation 17

$$\varepsilon_j = -\frac{H_{i,j}G_{i,j}\bar{\rho}_{Li,j}L_{effj}P_{0j}}{H_{i,E}G_{i,E}\bar{\rho}_{Li,E}L_{effE}P_{0E}} \quad (17)$$

Inserting an equalization weighting factor of Equation 17 into either Equation 12 or 13, results in an effective equalization OMI for a composite modulation term may be defined by:

Equation 18

$$\varepsilon_j m_j = -\frac{H_{i,j}G_{i,j}\bar{\rho}_{Li,j}L_{effj}P_{0j}}{H_{i,E}G_{i,E}\bar{\rho}_{Li,E}L_{effE}P_{0E}} m_j \quad (18)$$

Since, Equation 18 may represent an OMI for each composite modulation term modulating an equalization signal, a restriction of $|\epsilon_j m_j| \leq 1$ may be imposed. First order effect of a Raman crosstalk due to a time dependent modulation of co-propagating signals on $\lambda_i$ may be significantly mitigated if Equation 18 holds true with the restriction. Unmodulated Raman crosstalk effects may be significantly mitigated if Equation 14 also holds true. Replacing the product of terms on the left side of Equation 14 within the summation by their collective mean value may result in:

Equation 19

$$\overline{H_{i,j}G_{i,j}\bar{\rho}_{Li,j}L_{effj}P_{0j}}\Sigma_{j=1}{}^n 1 = -H_{i,E}G_{i,E}\bar{\rho}_{L\,i,E}L_{effE}P_{0E} \quad (19)$$

OR $$\overline{H_{i,j}G_{i,j}\bar{\rho}_{Li,j}L_{effj}P_{0j}}n = -H_{i,E}G_{i,E}\bar{\rho}_{L\,i,E}L_{effE}P_{0E}$$

Equation 19 may indicate that an equalizer power may need to be increased to a level approximately equal to n times the average power of interfering transmitters in order to accomplish substantial Raman equalization of unmodulated terms. This may be defined by:

Equation 20

$$P_{0E} \approx \Sigma_{j=1}{}^n P_{0j} = n\overline{P_{0j}} \quad (20)$$

Where:
n=number of interfering transmitters

However, complete Raman equalization of unmodulated terms may not be practical in an actual system deployment. Therefore, a case-by-case evaluation may be performed to make this determination. Furthermore, neither Equation 19 nor Equation 20 may need to be satisfied to equalize time dependent modulated crosstalk terms. Only satisfying Equation 18 parameters may be needed to equalize dependent modulated crosstalk terms. Therefore, an equalizer power approximately equal to an average interfering transmitter power may accomplish substantial Raman equalization of unmodulated terms.

Dispersion effects may be introduced with a few modifications to the preceding equations of this disclosure. Bandwidth-limited composite modulation on an equalizer signal may be used, since dispersion effects may have a "low-pass" RF filtering effect on Raman crosstalk levels. Due to this bandwidth-limited composite modulation, a much lower cost equalizer laser transmitter may be used, as an equalizer laser transmitter may not need to perform at a similar operational data rates as the interfering signals for which it may be compensating. Due to a presence of composite modulation terms, an equalizer transmitter may be a highly linear device. Otherwise, the equalizer transmitter may inadvertently generate undue levels of second order distortions that may fall within a television RF band that may be transferred via Raman crosstalk onto a video carrier wavelength.

The dispersion effects can be inserted by borrowing from the results of previous work, Phillips, Journal of Lightwave Technology 10 Oct. 1999 (Phillips), which is incorporated herein by reference. This may require replacing static effective lengths by effective lengths that depend upon an RF spectral component and the two wavelengths $\lambda_i$ and $\lambda_j$, which may be defined by:

Equations 21 and 22

$$L_{eff\,j} \Rightarrow L_{eff_{i,j}}(\omega_{RF}) \equiv \frac{1 - e^{-\alpha_j L}e^{-id_{i,j}\omega_{RF}L}}{\alpha_j + id_{i,j}\omega_{RF}} \quad (21)$$

Where:
$L_{eff\,i,j}$=a nonlinear effective length in an optical fiber of a signal at a wavelength $\lambda_i$ when it may be interacting with a signal at wavelength $\lambda_j$
$\omega_{RF}$=an RF frequency (within a modulation band) where Raman crosstalk may be the subject of examination
$\alpha_j$=a fiber loss parameter at $\lambda_j$
$d_{i,j}$=a dispersive walkoff parameter for signals at $\lambda_i$ and $\lambda_j$ (e.g. a difference of inverse group velocities at the two wavelengths) defined by Equation 22

$$d_{i,j} = \frac{1}{v_{gi}} - \frac{1}{v_{gj}} \quad (22)$$

$$\approx D(\lambda_i - \lambda_j)$$

Where:
$v_{gi}$=a group velocity at $\lambda_i$
$v_{gj}$=a group velocity at $\lambda_j$
D=a dispersion coefficient [ps/(km-nm)]

When there is no dispersion, $d_{i,j}$ may be zero and Equation 21 may revert back to an ordinary static nonlinear effective length. A magnitude square of Equation 21 may be defined by:

Equation 23

$$|L_{eff\,i,j}(\omega_{RF})|^2 = \frac{1 - \text{Exp}[-2\alpha_j L] - \text{Exp}[-2\alpha_j L]\text{Cos}[d_{i,j}\omega_{RF}L]}{(\alpha_j)^2 + (d_{i,j}\omega_{RF})^2} \quad (23)$$

Only retaining time dependent modulation terms from Equation 10 may result in:

Equation 24

$$P_i(t,L)_{MOD} = P_{0i}m_i f_i(t)e^{-\alpha_i L} + P_{0i}e^{-\alpha_i L}\Sigma_{j=1}{}^n H_{i,j}$$
$$G_{i,j}\bar{\rho}_{L\,i,j}L_{eff\,j}P_{0j}m_j f_j(t) \quad (24)$$

Where:

$P_i(t,L)_{MOD}$=a time dependent modulation version of an instantaneous power of $\lambda_i$ at time "t" and optical fiber distance "L"

A ratio of the first term to the second term of Equation 24 may give a Raman crosstalk noise ratio in the optical frequency domain (e.g. prior to photodetection), which may be defined by:

Equation 25

$$CCR_i(t, L)_{Opt} = \frac{m_i f_i(t)}{\sum_{j=1}^{n} H_{i,j} G_{i,j} \bar{\rho}_{Li,j} L_{\mathit{eff}_j} P_{0j} m_j f_j(t)} \quad (25)$$

Where:

$CCR_i(t, L)_{Opt}$=a Raman crosstalk noise ratio in the optical frequency domain In order to transform the ratio of Equation 25 into the frequency domain, interfering modulation terms may be represented by:

Equations 26 and 27

$$f_j(t) = \Sigma_k \alpha_k^j \cos[k\omega_j t] \quad (26)$$

With a corresponding spectrum:

$$\mathfrak{I}[f_j(t)] = \sum_k \alpha_k^j [\delta(\omega - k\omega_j) + \delta(\omega + k\omega_j)] \quad (27)$$

Where:

$\alpha_k^j$=a Fourier coefficient determined by the particular modulation type (for a baseband data stream signal these may be determined by a sinc function envelope)

$\omega_j$=a frequency determined from the data or symbol rates of transmitted data stream signal on $\lambda_j$ For a signal of interest on which crosstalk may be measured, RF sinusoidal modulation terms representing each TV channel carrier may be defined by:

Equations 28 and 29

$$f_i(t) = \Sigma_M A_M^i \cos[\omega_M t] \quad (28)$$

With a corresponding spectrum:

$$\mathfrak{I}[f_i(t)] = \sum_M A_M^i [\delta(\omega - \omega_M) + \delta(\omega + \omega_M)] \quad (29)$$

Where:

$\omega_M$=a video stream signal center frequency $A_M^i$=an amplitude of an $M^{th}$ TV RF carrier signal being transmitted on an $i^{th}$ optical signal at a wavelength $\lambda_i$.

Equations 28 and 29 may model TV channels as RF sinusoidal carriers at center frequencies ($\omega_M$) with constant amplitudes being sub-multiplexed onto $\lambda_i$. Since only the positive frequency terms of Equation 29 may be needed, Equation 25 in the frequency domain may become:

Equation 30

$$CCR_i(\omega, L)_{Opt} = \frac{m_i \sum_M A_M^i \delta(\omega - \omega_M)}{\sum_{j=1}^{n} H_{i,j} G_{i,j} \bar{\rho}_{Li,j} P_{0j} m_j L_{\mathit{eff}_{i,j}}(\omega) * \sum_k \alpha_k^j [\delta(\omega - k\omega_j) + \delta(\omega + k\omega_j)]} \quad (30)$$

Where:

*=denotes a convolution

The numerator of Equation 30 may only be non-zero at specific TV channel carrier frequencies $\omega_M$. Equation 30 may only need to be evaluated at specific TV carrier frequencies, which may result in:

Equation 31

$$CCR_i(\omega_M, L)_{Opt} = \frac{m_i A_M^i}{\sum_{j=1}^{n} H_{i,j} G_{i,j} \bar{\rho}_{Li,j} P_{0j} m_j L_{\mathit{eff}_{i,j}}(\omega) * \sum_k \alpha_k^j [\delta(\omega_M - k\omega_j) + \delta(\omega_M + k\omega_j)]} \quad (31)$$

The square magnitude of the numerator and the sum of the square magnitudes of each term in the j summation of Equation 31 may be needed to convert Equation 31 into a post optical detection RF domain. Since the terms of Equation 31 may be assumed to be uncorrelated, which may add incoherently as a sum of electrical powers, Equation 31 may become:

Equation 32

$$CCR_i(\omega_M, L)_{RF} = \frac{|m_M^i|^2}{\sum_{j=1}^{n} (H_{i,j} G_{i,j} \bar{\rho}_{Li,j} P_{0j})^2 \left| m_j L_{\mathit{eff}_{i,j}}(\omega) * \sum_k \alpha_k^j [\delta(\omega_M - k\omega_j) + \delta(\omega_M + k\omega_j)] \right|^2} \quad (32)$$

Where:

$m_M^i = m_i A_M^i$=an OMI for a TV channel at a frequency $\omega_M$ being carried on $\lambda_i$ Kim, IEEE Photonics Technology Letters 10 Oct. 2001 (Kim), which is incorporated herein by reference, may have shown that the terms within the absolute value sign of Equation 32 may be replaced with an expression defined by:

Equations 33 and 34

$$\left| m_j L_{\mathit{eff}_{i,j}}(\omega) * \sum_k a_k^j [\delta(\omega_M - k\omega_j) + \delta(\omega_M + k\omega_j)] \right|^2 \approx \tag{33}$$

$$|L_{\mathit{eff}_{i,j}}(\omega_M)|^2 \frac{4\mathrm{Sinc}[\omega_M / 2R_j]^2 B_M}{R_j}$$

An effective digital OMI measured at $\omega_M$ may be defined by:

$$m_{\mathit{eff},j}(\omega_M) = \sqrt{\frac{4\mathrm{Sinc}[\omega_M / 2R_j]^2 B_M}{R_j}} \tag{34}$$

Where:
$R_j$=a baseband data stream signaling rate (bit rate or a symbol rate of multilevel data stream signals) for data being transported on $\lambda_j$
$B_M$=a baseband TV channel bandwidth Digital transmission traffic in Equation 32 may be assumed to have relatively high extinction ratios. Also, it may be assumed that the TV channel bandwidth $B_M$ is much smaller than data stream signaling rates $R_j$. Using Equation 33 in conjunction with Equation 23 in Equation 32 may give a TV carrier to Raman crosstalk ratio in an electrical RF domain (after photodetection) defined by:

Equation 35

$$CCR_i(\omega_M, L)_{RF} = \frac{|m_M^i|^2}{\sum_{j=1}^n (H_{i,j} G_{i,j} \bar{\rho}_{Li,j} P_{0j})^2 \left( \frac{1 + \mathrm{Exp}[-2\alpha_j L] - 2\mathrm{Exp}[-2\alpha_j L]\mathrm{Cos}[d_{i,j}\omega_M L]}{(\alpha_j)^2 + (d_{i,j}\omega_M)^2} \right) \frac{4\mathrm{Sinc}[\omega_M / 2R_j]^2 B_M}{R_j}} \tag{35}$$

Due to the sinc function and the dispersive effective length the Raman crosstalk, power may diminish roughly as $(\omega_M)^{-4}$ in Equation 35. Therefore, the CCR of Equation 35 may improve as a function of TV channel RF carrier frequency in rough proportion to $(\omega_M)^4$ which may result in:

Equation 36

$$CCR_i(\omega_M, L)_{RF} \approx \tag{36}$$

$$\frac{1}{n-1} \frac{|m_M^i|^2}{\frac{4B_M R_j}{(\alpha_j)^2 + (d_{i,j}\omega_M)^2} \left( \frac{2R_j}{\omega_M} \right)^2} \propto \frac{|m_M^i|^2 (\bar{d})^2 (\omega_M)^4}{n-1}$$

Where:
n=total number of optical signals in an optical communication system (thus, n−1 is a total number of Raman crosstalk interfering signals)
$\bar{d}$=an average walkoff parameter On a dB scale, Equation 36 may be defined by:

Equation 37

$$CCR_i(\omega_M, L)_{RF,dB} \approx 40 \log(\omega_M) + 20 \log(\bar{d}) - 10 \log(n-1) \tag{37}$$

Each doubling of an RF TV carrier frequency ($\omega_M$) may show a roughly 12 dB improvement in carrier to Raman crosstalk (CCR) levels without equalization compensation being applied. A ten times increase in $\omega_M$ may imply a roughly 40 dB improvement in CCR levels. A CCR level at a $\omega_M$ of 110 MHz may be roughly 12 dB better than CCR levels experienced at a $\omega_M$ of 55 Megahertz (MHz) without equalization compensation being applied. Similarly the CCR level at a $\omega_M$ of 550 MHz may be roughly 40 dB better than CCR levels experienced at a $\omega_M$ of 55 MHz without equalization compensation being applied. Thus, Raman CCR level improvements may realized more at lower ends of an RF TV carrier frequency spectrum (e.g. 55-250 MHz).

Even in a realm of near zero dispersion where a nonlinear effective length reverts back to a static value, the sinc function of Equation 32 may still provide effective low pass filtering of Raman crosstalk. In a realm of near zero dispersion Equation 37 may become:

Equation 38

$$CCR_i(\omega_M, L)_{RF,dB} \approx 20 \log(\omega_M) - 10 \log(n-1) \tag{38}$$

Improvement of a CCR level corresponding to increasing TV channel center frequencies may be only half of an improvement of a dispersive case, but nonetheless there may be a significant improvement in CCR levels with increasing RF carrier frequency. This may form a basis for a justification to utilize composite bandwidth-limited modulation terms on an equalizer laser. Thus, there may be a need to cancel out, using an equalizer, only lower frequency Raman crosstalk terms. The natural physics of the situation may reduce Raman crosstalk levels corresponding to increasing TV channel RF carrier frequencies. This may imply that a simplified design may be used to implement an equalizer transmitter design, with an accompanying cost savings. These cost savings may be realized while simultaneously improving a system noise performance on lower frequency video channels.

In order to set up an equalization cancellation with composite modulation while including effects of dispersion Equation 16 may once again be addressed, but in this case static effective lengths may be replaced with Equation 21 dispersive effective lengths. Solving for an equalization weighting factor under these conditions may result in:

Equation 39

$$\varepsilon_j = -\frac{H_{i,j} G_{i,j} \bar{\rho}_{Li,j} L_{eff_{i,j}} P_{0j}}{H_{i,E} G_{i,E} \bar{\rho}_{Li,E} L_{eff_{i,E}} P_{0E}} \quad (39)$$

Furthermore, in conjunction with either Equation 12 or Equation 13, an effective equalization OMI on composite modulation terms may be:

Equations 40 and 41

$$\varepsilon_j m_j = -\frac{H_{i,j} G_{i,j} \bar{\rho}_{Li,j} L_{eff_{i,j}} P_{0j}}{H_{i,E} G_{i,E} \bar{\rho}_{Li,E} L_{eff_{i,E}} P_{0E}} m_j \quad (40)$$

With a restriction:

$$|\varepsilon_j m_j| \leq 1 \quad (41)$$

When dispersion effect are taken into consideration, Equation 15 may be defined by:

Equation 42

$$\sum_{j=1}^{n} \left( H_{i,j} G_{i,j} \bar{\rho}_{Li,j} L_{eff_{i,j}} P_{0j} + P_{0E} H_{i,E} G_{i,E} \bar{\rho}_{Li,E} L_{eff_{i,E}} \varepsilon_j \right) m_j f_j(t) = 0 \quad (42)$$

There may be no restriction on an equalizer wavelength defined by Equation 42, if an equalization weighting factor $\varepsilon_j$ of Equation 39 may be realized for a given equalizer wavelength. Some practical choices based on relative positions of an interfering wavelengths and a video carrying wavelength may be made.

For example, a first practical choice may involve when all interfering signals have shorter wavelengths than a video carrying wavelength, so each interfering signal may be pumping a video wavelength. Thus, each Equation 42 $H_{i,j}$ term may be positive. An equalizer wavelength that is longer than a video carrier wavelength may be selected so that $H_{i,E}$ may be negative. Calculating a mean value of all Raman gains associated with the interfering terms with respect to the video wavelength may be involved in further refining a choice of $\lambda_E$ as defined by:

Equation 43

$$\langle G_{i,j} \rangle = \frac{1}{n-1} \sum_{j=1}^{n} G_{i,j} \quad (43)$$

Using a mean value of all Raman gains of Equation 43, a $\lambda_E$ may be selected that is longer than $\lambda_i$ ($\lambda_E > \lambda_i$) and also have a Raman gain value equal to $\langle G_{i,j} \rangle$ ($G_{i,E} = \langle G_{i,j} \rangle$).

In another, a second practical choice may involve when interfering signals have longer wavelengths than a video carrying wavelength, so each interfering signal may be pumped by the video wavelength. Thus, the $H_{i,j}$ terms in Equation 42 may be negative. A shorter equalizer wavelength than the video carrier wavelength may be selected so that $H_{i,E}$ may be positive. A $\lambda_E$ value may be selected that may be shorter than $\lambda_i$ ($\lambda_E < \lambda_i$) and also has a Raman gain value equal to $\langle G_{i,j} \rangle$ ($G_{i,E} = \langle G_{i,j} \rangle$) as calculated in Equation 43.

For example, a third choice may involve when the interfering signals have wavelengths that fall above and below a video carrying wavelength, so some of these signals may be pumped by the video wavelength and others will be pumping the video wavelength. Thus, the $H_{i,j}$ terms from Equation 42 may be both positive and/or negative depending on the relative wavelength positions. Under these conditions, a practical selection of $\lambda_E$ may fall somewhere between the shortest and longest interfering wavelengths. The values of $\varepsilon_j$ may be polarized correctly using electronic circuitry in accordance with Equation 40. An equalizer wavelength may selected so that $\lambda_E$ has a Raman gain value equal to $\langle G_{i,j} \rangle$ as calculated in Equation 43 ($G_{i,E} = \langle G_{i,j} \rangle$) and also falls between the longest and shortest interfering wavelengths ($\lambda_{j(MIN)} < \lambda_E < \lambda_{j(MAX)}$). Individual dispersive walk-off values between $\lambda_i$ and each of the interfering terms may be taken into consideration to further refine a selection of $\lambda_E$. A mean walk-off parameter value may be calculated by:

Equation 44

$$\langle d_{i,j} \rangle = \frac{1}{n-1} \sum_{j=1}^{n} d_{i,j} \quad (44)$$

A wavelength value that has a walk-off value relative to $\lambda_i$ as calculated in Equation 44 ($\lambda_{E,D}$) may be determined by:

Equation 45

$$d_{i,D} = \langle d_{i,j} \rangle \quad (45)$$

Where:

$\langle d_{i,j} \rangle$ may be calculated using inverse group velocities of $\lambda_{E,D}$ and $\lambda_i$ In another example, a fourth practical choice for an equalizer wavelength may be based on a mean value of $\lambda_E$ and $\lambda_{E,D}$, which may be defined by:

Equation 46

$$\langle \lambda_E \rangle = \frac{\lambda_E + \lambda_{E,D}}{2} \quad (46)$$

For example, a fifth practical choice for an equalizer wavelength may be based on selecting a mean value of all interfering wavelengths, which may be defined by:

Equation 47

$$\lambda_{E,M} = \frac{1}{n-1}\sum_{j=1}^{n}\lambda_j(1-\delta_{i,j}) \tag{47}$$

In another example, a sixth practical choice for an equalizer wavelength may be based on selecting a mean value of all five of the preceding practical choices. Ultimately, an equalizer wavelength selection may be determined by a compromise between a wavelength, which provides the best equalization, requires the simplest modulation circuitry to realize the $\epsilon_j$ values, and may be compliant with a system wavelength plan without incurring additional complications.

An output power level of an equalizer transmitter may be approximately equal to a power output level of a single interferer if all individual interferers have approximately the same launch powers and a required composite OMI level of equalizing modulation is neither too shallow so as to render equalization ineffective nor too high so as to induce unwanted second order distortions. Using composite modulation terms may require an equalizer transmitter to be a highly linear device to avoid generating undue levels of second order distortions having spectral content falling within a television RF band. Second order distortion terms may be transferred, via Raman crosstalk, onto a video carrier wavelength. If the second order distortion terms are at high enough levels, they may further deteriorate the quality of video information being transmitted. If all losses resulting from passive components (e.g. the mux) have been accounted for and all interfering signals are launched at a substantially similar power level, a practical launch power for an equalizer transmitter may be a mean launch power level of all interfering signals defined by:

Equation 48

$$P_{0E} = \langle P_{0j} \rangle = \frac{1}{n-1}\sum_{j=1}^{n}P_{0j}(1-\delta_{i,j}) \tag{48}$$

When designing an equalizer transmitter, the diminishing deleterious Raman crosstalk effects correlating with increasing modulation spectral frequencies (e.g. as in Equations 36 and 37) may take advantage of this fact. An equalizer transmitter may only need to operate over a narrow modulation bandwidth in comparison to the co-propagating data stream signal transmitters inducing Raman crosstalk noise. The co-propagating data stream signal transmitters may have a capability of handling a full spectral content of modulation formats at data rates utilized in systems 200, 300, and/or 400. Raman crosstalk effects may not require reduction by an equalizer transmitter above some maximum frequency, as they may naturally become insignificant. An equalizer modulation bandwidth (or equivalently maximum frequency where Raman crosstalk has any significant impact on video signal performance) may be determined by several factors. These factors may comprise data stream signal modulation symbol rates, TV channel bandwidth, optical wavelengths, transmission link length, co-propagating data stream signal transmitters' optical launch powers, a number of interfering transmitters, and a worst case acceptable CCR on TV channels resulting from Raman crosstalk. Referring back to Equation 32 and utilizing Equation 33 may result in:

Equation 49

$$CCR_i(\omega_M, L)_{RF} = \frac{|m_M^i|^2}{\sum_{j=1}^{n}\left|H_{i,j}G_{i,j}\overline{\rho}_{Li,j}P_{0j}L_{\mathit{eff}_{i,j}}(\omega)\mathrm{Sinc}[\omega_M/2R_j]\sqrt{\frac{4B_M}{R_j}}\right|^2} \tag{49}$$

In Equation 49, Raman crosstalk from each interfering signal may be added incoherently to one another. The carrier-to-noise ratio (CNR) on a TV channel being transmitted on $\lambda_i$ at position L without Raman crosstalk noise may be given in an electrical RF domain by:

Equation 50

$$CNR_{0,i}(\omega_M, L)_{RF} = \left|\frac{m_M^i P_{0i}\mathrm{Exp}[-\alpha_i L]}{P_{N,0}(\omega_M, L)}\right|^2 \tag{50}$$

Where $P_{N,O}(\omega_M, L)$ may be an equivalent optical noise power at an RF frequency $\omega_M$ at position L in a system. Then to first order a CNR at $\omega_M$ at position L with Raman crosstalk interferers present may be defined by:

Equation 51

$$CNR_i(\omega_M, L)_{RF} = \left[\frac{1}{CNR_{0,i}(\omega_M, L)_{RF}} + \frac{1}{CCR_i(\omega_M, L)_{RF}}\right]^{-1} = \tag{51}$$

$$\frac{|m_M^i P_{0i}\mathrm{Exp}[-\alpha_i L]|^2}{|P_{N,0}(\omega_M, L)|^2 + |P_{0i}\mathrm{Exp}[-\alpha_i L]|^2}$$

$$\sum_{j=1}^{n}\left|H_{i,j}G_{i,j}\overline{\rho}_{Li,j}P_{0j}L_{\mathit{eff}_{i,j}}(\omega)\mathrm{Sinc}[\omega_M/2R_j]\sqrt{\frac{4B_M}{R_j}}\right|^2$$

It may be observed in Equation 51 that $CNR_{O,i}(\omega_M, L)_{RF} \approx CNR_i(\omega_M, L)_{RF}$. However, above some frequency $(\omega_{MAX})$, there may also be:

Equation 52

$$CNR_{0,i}(\omega_M, L)_{RF} \approx CNR_i(\omega_M, L)_{RF} \text{ for } \omega_M \geq \omega_{MAX} \tag{52}$$

The inclusion of an equalizer may improve a CNR given by Equation 51 by reducing Raman crosstalk noise power of each term of the summation in the denominator of Equation 51. A term-by-term (partial) cancellation of Raman crosstalk contributions of each interferer by an equalizer may be a coherent destructive interference effect. Therefore, equalizer terms appearing within the absolute value sign of the summation of Equation 51 and an equalizer composite modulation terms may utilize interferer modulation terms in order to induce a destructive interference after appropriately scaling and phasing each term in accordance with Equation 40. So with the equalization present Equation 51 may become:

Equation 53

$$CNR_i(\omega_M, L)_{RF} = \frac{|m_M^i P_{0i} \text{Exp}[-\alpha_i L]|^2}{\left(|P_{N,0}(\omega_M, L)|^2 + |P_{0i}\text{Exp}[-\alpha_i L]|^2 \times \left\{\sum_{j=1}^{n}\left|\begin{pmatrix}H_{i,j}G_{i,j}\bar{\rho}_{Li,j}P_{0j}L_{eff_{i,j}}(\omega) + \\ \varepsilon_j H_{i,E}G_{i,E}\bar{\rho}_{Li,E}P_{0E}L_{eff_{i,E}}(\omega)F(\omega,\omega_{MAX})\end{pmatrix}\text{Sinc}[\omega_M/2R_j]\sqrt{\frac{4B_M}{R_j}}\right|^2\right\}\right)} \quad (53)$$

Where $\epsilon_j$ may be given by Equation 39 and the function $F(\omega, \omega_{MAX})$ may be a low pass filter response with cutoff frequency given by $\omega_{MAX}$. An inverse phase response of $F(\omega, \omega_{MAX})$ may be assumed to be included in the $\epsilon_j$ equalizing parameters of Equation 39 in order to preserve a desired term-by-term destructive interference effect of an equalizer. A suitable value of $\omega_{MAX}$ may be determined by taking a ratio of Equation 50 to Equation 51, which may determine the extent to which CNR without Raman crosstalk noise exceeds a CNR including Raman crosstalk noise defined by:

Equations 54 and 55

$$CNR_{0,i}(\omega_M, L)_{RF} = 1 + \frac{|P_{0i}\text{Exp}[-\alpha_i L]|^2}{|P_{N,0}(\omega_M, L)|^2} \quad (54)$$

$$\sum_{j=1}^{n}\left|H_{i,j}G_{i,j}\bar{\rho}_{Li,j}P_{0j}L_{eff_{i,j}}(\omega)\text{Sinc}[\omega_M/2R_j]\sqrt{\frac{4B_M}{R_j}}\right|^2$$

$$\frac{CNR_{0,i}(\omega_M, L)_{RF}}{CNR_i(\omega_M, L)_{RF}} = 1 + \left(\frac{1}{m_M^i}\right)^2 CNR_{0,i}(\omega_M, L)_{RF} \quad (55)$$

$$\sum_{j=1}^{n}\left|H_{i,j}G_{i,j}\bar{\rho}_{Li,j}P_{0j}L_{eff_{i,j}}(\omega)\text{Sinc}[\omega_M/2R_j]\sqrt{\frac{4B_M}{R_j}}\right|^2$$

A ratio of CNR without Raman crosstalk noise may exceed a CNR including Raman crosstalk noise because such a number may grow larger as the Raman crosstalk noise level increases since $CNR_i(\omega_M, L)_{RF}$ may get smaller with increasing levels of Raman crosstalk noise. The closer Equation 51's value may be to unity, the less the extent of a relative level of Raman crosstalk noise may occur at a particular frequency since $CNR_{0,i}(\omega_M, L)_{RF} > CNR_i(\omega_M, L)_{RF}$. The summation terms of Equation 55 may be replaced by their maximum limiting values in Equation 55 to determine a worst case scenario. A worst case scenario may be determined by calculating each of the parameters $H_{i,j}$, $G_{i,j}$, $L_{eff_{i,j}}(\omega)$ relative to $\lambda_i$ and replace the individual terms in the summation with the largest magnitude values of each parameter to potentially determine a worst case scenario. This may be shown by:

Equation 56

$$H_{i,j} \Rightarrow H_{i,MAX}, G_{i,j} \Rightarrow G_{i,MAX}, P_{0j} \Rightarrow P_{0j\,MAX} \quad (56)$$

Where:
$P_{0j\,MAX}$=a highest launch power of data stream signal interferer optical signals A power of video channel $P_{0i}$ may be much larger than a data stream signals' optical launch powers, but potentially only interferer launch powers may be considered here. Also, the $P_{0j}$ may possibly be identical so that $P_{0j\,MAX}=P_{0j}$. The value of a length averaged polarization overlap probabilities may range from 0 to 1, but a reasonably realistic number may lie somewhere between 0.5 and 1. A maximum square magnitude of an effective length from Equation 23 may be defined by:

Equation 57

$$|L_{eff_{i,j}}(\omega_{RF})|^2 \Rightarrow \frac{1+\text{Exp}[-2\alpha_j L]}{(\alpha_j)^2 + (d_{i,j}\omega_{RF})^2} \quad (57)$$

From this, a limiting uppermost maximum value may be set by determining a minimum value of loss parameters ($\alpha_j$) for all interferers and also a minimum value of dispersion walk-off parameter ($d_{i,j}$) for all interferers relative to $\lambda_i$. This may be shown by:

Equation 58

$$|L_{eff_{i,MAX}}(\omega_{RF})|^2 \Rightarrow \frac{1+\text{Exp}[-2\alpha_{j,MIN}L]}{(\alpha_{j,MIN})^2 + (d_{i,MIN}\omega_{RF})^2} \quad (58)$$

By substituting these worst case values, Equation 55 may become:

Equation 59

$$\frac{CNR_{0,i}(\omega_M, L)_{RF}}{CNR_i(\omega_M, L)_{RF\,WC}} = 1 + \left(\frac{1}{m_M^i}\right)^2 CNR_{0,i}(\omega_M, L)_{RF} \quad (59)$$

$$\frac{(n-1)(H_{i,Max}G_{i,MAX}\bar{\rho}_L P_{0jMax})^2}{[(\alpha_{j,MIN})^2 + (d_{i,MIN}\omega_M)^2](\omega_M)^2}$$

Where:
$R_{WC}$=a worst case data stream signal symbol rate amongst all $R_j$ terms n−1=a total number of interferer data stream signal transmitters In order to determine $R_{WC}$, two scenarios may need to be explored. In a first scenario, $$\frac{\omega_M}{R_{WC}}$$

may be small so that $$\sin\left(\frac{\omega_M}{R_{WC}}\right)^2 \approx \left(\frac{\omega_M}{R_{WC}}\right)^2$$

and a worst case symbol rate may be equal to a minimum value of the $R_j$ terms and Equation 59 may become:

Equation 60

$$\frac{CNR_{0,i}(\omega_M, L)_{RF}}{CNR_i(\omega_M, L)_{RF\ WC}} = 1 + \left(\frac{1}{m_M^i}\right)^2 CNR_{0,i}(\omega_M, L)_{RF} \qquad (60)$$

$$\frac{(n-1)(H_{i,Max}G_{i,MAX}\bar{P}_L P_{0,jMax})^2 (1 + \text{Exp}[-2\alpha_{j,MIN}L])4\ B_M}{[(\alpha_{j,MIN})^2 + (d_{i,MIN}\omega_M)^2]R_{MIN}}$$

In a second scenario, $$\frac{\omega_M}{R_{WC}}$$

may not be small so that $$\sin\left(\frac{\omega_M}{R_{WC}}\right)^2 \neq \left(\frac{\omega_M}{R_{WC}}\right)^2.$$

In this scenario $$\sin\left(\frac{\omega_M}{R_{WC}}\right)^2$$

may be replaced by 1 (what may be its maximum value). A worst case symbol rate for this scenario may be equal to a maximum value of the $R_j$ terms and Equation 59 may become:

Equation 61

$$\frac{CNR_{0,i}(\omega_M, L)_{RF}}{CNR_i(\omega_M, L)_{RF\ WC}} = \qquad (61)$$

$$1 + \left(\frac{1}{m_M^i}\right)^2 CNR_{0,i}(\omega_M, L)_{RF} \frac{(n-1)(H_{i,Max}G_{i,MAX}\bar{P}_L P_{0,jMax})^2}{[(\alpha_{j,MIN})^2 + (d_{i,MIN}\omega_M)^2]\ (\omega_M)^2}$$

Figure 5:
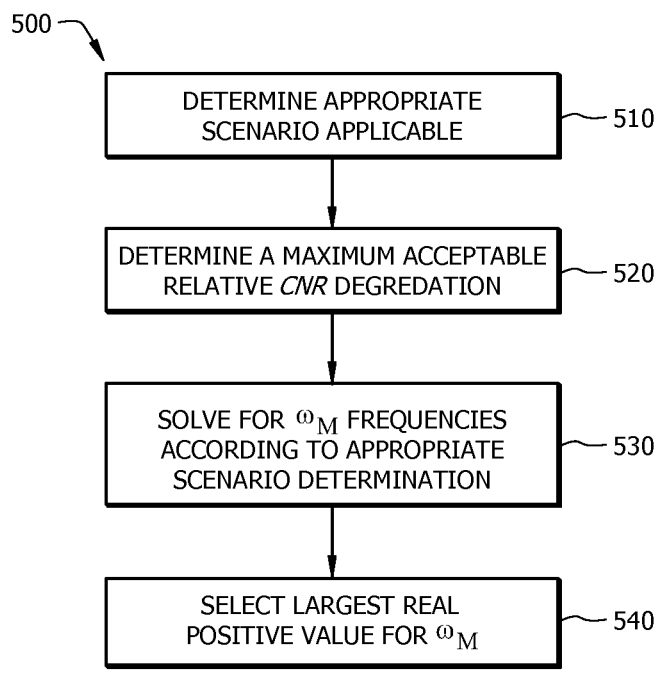
FIG. 5 is a flowchart depicting an embodiment of a method of solving for an equalizer worst case maximum cutoff frequency for a bandwidth limiting filter.

FIG. 5 is a flowchart depicting an embodiment of a method of solving for an equalizer worst case maximum cutoff frequency ($\omega_{MAX}$) for a bandwidth limiting filter. Method 500 may use either Equation 60 and/or Equation 61 to solve for an equalizer worst case maximum cutoff frequency $\omega_{MAX}$. At block 510, a determination may be made as to which scenario may be applicable scenario 1 (e.g.

$$\frac{\omega_M}{R_{WC}}$$

is small) or scenario 2 (e.g.

$$\frac{\omega_M}{R_{WC}}$$

is not small). At block 520, based on system performance goals for the video channels, method 500 may determine a maximum acceptable relative level of video CNR degradation due to Raman crosstalk noise effects. Next at block 530, depending on whether scenario 1 or scenario 2 may be applicable, either Equation 60 or Equation 61 may be set to a level determined at block 520 and solved for frequencies $\omega_M$ that may solve the appropriate equation. As Equation 60 is quadratic in $\omega_M$ and Equation 61 is fourth order in $\omega_M$, multiple solutions may arise. With practical system knowledge, a largest real positive value of $\omega_M$ may be selected at block 540. This may result in a worst case maximum equalizer transmitter cutoff frequency $\omega_{MAX}$. For a given system, all video carrier frequencies above $\omega_{MAX}$ may naturally experience Raman crosstalk noise levels that may be acceptably low enough so as not to significantly degrade the information. However, an equalizer may need to reduce Raman crosstalk noise on video channels with carrier frequencies below $\omega_{MAX}$.

Solving for an equalizer worst case cutoff frequency $\omega_{MAX}$ using method 500 may be demonstrated by considering the following two example cases. In Case 1 an optical communication system may comprise five optical signals (n=5) in a 20 kilometer (km) link. The five optical signals may be defined as:

Signal 1: Video Carrier on 1555.0 nm with OMI 3.45% loaded from 55 MHz to 1 GHz with 6 MHz TV channel Bandwidth.

Signal 2: Data stream at 1.25 GB/s on 1575.4 nm with a 0 dBm launch power.

Signal 3: Data stream at 1.25 GB/s on 1577.0 nm with a 0 dBm launch power.

Signal 4: Data stream at 1.25 GB/s on 1578.7 nm with a 0 dBm launch power.

Signal 5. Data stream at 1.25 GB/s on 1580.4 nm with a 0 dBm launch power.

In Case 2 a substantially similar optical communication system may also comprise five optical signals (n=5) in a 20 kilometer (km) link. The five optical signals may be defined as:

Signal 1: Video Carrier on 1555.0 nm with OMI 3.45% loaded from 55 MHz to 1 GHz with 6 MHz TV channel Bandwidth.

Signal 2: Data stream at 10.0 GB/s on 1575.4 nm with a 0 dBm launch power.

Signal 3: Data stream at 10.0 GB/s on 1577.0 nm with a 0 dBm launch power.

Signal 4: Data stream at 10.0 GB/s on 1578.7 nm with a 0 dBm launch power.

Signal 5. Data stream at 10.0 GB/s on 1580.4 nm with a 0 dBm launch power.

The optical communication systems of Cases 1 and 2 may experience a CNR without Raman crosstalk on a specified video of 51 dB (125893 absolute). Also, with an inclusion of Raman crosstalk by four interferers, an acceptable value is 49.5 dB. An allowable degradation is 1.5 dB or an absolute relative factor of 1.41254. The relevant parameters may be as follows:

TABLE 1

Example $\omega_{MAX}$ calculation parameters

| Wavelength (nm) | Loss Parameter $\alpha_j$ (1/km) | Raman Gain $G_{1,j}$ 1/(W-km) | Pump Probe Parameter $H_{1,j}$ | Dispersive Walk-Off $d_{1,j}$ (sec/km) | Data Rate CASE A (GB/s) | Data Rate CASE B (GB/s) | Launch Power (dBm) |
|---|---|---|---|---|---|---|---|
| 1555.0 | 0.04511 | 0 | N/A | 0 | N/A | N/A | +18 |
| 1575.4 | 0.04613 | 0.1867 | −1.0131 | −3.7235E−10 | 1.25 | 10.0 | 0 |
| 1577.0 | 0.04622 | 0.1941 | −1.0142 | −4.0255E−10 | 1.25 | 10.0 | 0 |
| 1578.7 | 0.04632 | 0.2018 | −1.0153 | −4.3480E−10 | 1.25 | 10.0 | 0 |
| 1580.4 | 0.04642 | 0.2081 | −1.0164 | −4.6721E−10 | 1.25 | 10.0 | 0 |

First calculate a maximum value of $$\frac{\omega_M}{2R_{MIN}}$$

for each data rate case, which may be given by:

Equations 62 and 63

For Case 1 with an $R_{MIN}$=1.25 Gigabytes per second (GB/s)

$$(\omega_M/2R_{MIN})_{MAX} = \frac{2\pi 1000}{2 \times 1250} = 2.51327 \quad (62a)$$

$$\mathrm{Sin}(\omega_M/2R_{MIN})_{MAX} = 0.587785 \quad (62b)$$

Which may be within the scenario of Equation 61 since $$\mathrm{Sin}(\omega_M/2R_{Min})_{Max}^2 \neq (\omega_M/2R_{Min})^2 \quad (62c)$$

For Case 2 with an $R_{MIN}$=10 GB/s)

$$(\omega_M/2R_{MIN})_{MAX} = \frac{2\pi 1000}{2 \times 10000} = 0.314159 \quad (63a)$$

$$\mathrm{Sin}(\omega_M/2R_{MIN})_{MAX} = 0.309017 \quad (63b)$$

Which may be within the scenario of Equation 60 since $$\mathrm{Sin}(\omega_M/2R_{Min})_{Max}^2 \approx (\omega_M/2R_{Min})^2 \quad (63c)$$

In Equations 62 and 63, a maximum TV RF carrier may be 1 Gigahertz (GHz) with data rates of 1.25 GB/s for Case 1 and data rates of 10 GB/s for Case 2. Using the parameters of table 1 in conjunction with Equation 61 for Case 1, $\omega_M$ may be solved using an equation defined by:

Equation 64

$$1+\left(\frac{1}{0.0345}\right)^2 125893 \frac{(1+\mathrm{Exp}[-2(0.04511)20])16\ 6.0\ 1250\ 4(1.0164\ 0.2081\ \bar{p}_L\ 0.001)^2}{[(0.04511)^2+((3.7235E-10)\omega_M)^2]\ (\omega_M)^2} = 1.41254 \quad (64)$$

Similarly, using the parameters of table 1 in conjunction with Equation 60 for Case 2, $\omega_M$ may be solved using an equation defined by:

Equation 65

$$1+\left(\frac{1}{0.0345}\right)^2 125893 \frac{(1+\mathrm{Exp}[-2(0.04511)20])4\ 6.0\ 4(1.0164\ 0.2081\ \bar{p}_L\ 0.001)^2}{[(0.04511)^2+((3.7235E-10)\omega_M)^2]\ 10000} = 1.41254 \quad (65)$$

Upon solving Equation 64 for Case 1 (1.25 GB/s data rates) and Equation 65 for Case 2 (10 GB/s data rates) for different values of $\bar{p}_L$, a value of $\omega_{MAX}$ and a corresponding frequency $f_{MAX}$ may be determined in Tables 2a and 2b.

TABLE 2a

Solutions for $\omega_{MAX}$ and $f_{MAX}$ for Case 1
(1.25 GB/s data) with allowable CNR of 49.5 dB

| $\bar{p}_L$ | $\omega_{MAX}$ (rad/sec) | $f_{MAX}$ (MHz) |
|---|---|---|
| 0.25 | 1.30125E9 | 207.100 |
| 0.50 | 1.84223E9 | 293.200 |
| 0.75 | 2.25707E9 | 359.224 |
| 1.00 | 2.60671E9 | 414.871 |

TABLE 2b

Solutions for $\omega_{MAX}$ and $f_{MAX}$ for case B
(10.0 GB/s data) with allowable CNR of 49.5 dB.

| $\bar{p}_L$ | $\omega_{MAX}$ (rad/sec) | $f_{MAX}$ (MHz) |
|---|---|---|
| 0.25 | 2.0775E8 | 33.065 |
| 0.50 | 4.6548E8 | 74.084 |
| 0.75 | 7.1124E8 | 113.198 |
| 1.00 | 9.5433E8 | 151.886 |

Based on these results, in case 1 an equalizer may require a maximum modulation bandwidth of 293.2 MHz for a polarization overlap factor of 0.5 as opposed to the data stream signal interferers which are transmitting data at 1.25 GB/s. Above 293.2 MHz (assuming $\bar{p}_L$=0.5), Raman crosstalk may be sufficiently small enough so that no equalization cancellation may be necessary. Similarly, but more dramatically, for Case 2, an equalizer may need a maximum modulation bandwidth of 74.1 MHz for a polarization overlap factor of 0.5 as opposed to the data stream signal interferers which are transmitting data at 10.0 GB/s. Above 74.15 MHz (assuming $\bar{\rho}_L=0.5$), Raman crosstalk may be sufficiently small enough so that no equalization cancellation may be necessary.

In other embodiments, CNR requirements with Raman crosstalk may be further relaxed so that an acceptable CNR with interferers present may be 48 dB. An allowable degradation may now be 3.0 dB or an absolute relative factor of 1.9953. Then the values of $\omega_{MAX}$ in Cases 1 and 2 may be as shown in tables 3a and 3b respectively:

TABLE 3a

Solutions for $\omega_{MAX}$ and $f_{MAX}$ for Case 1
(1.25 GB/s data) with allowable CNR of 48.0 dB.

| $\bar{\rho}_L$ | $\omega_{MAX}$ (rad/sec) | $f_{MAX}$ (MHz) |
|---|---|---|
| 0.25 | 1.04285E9 | 165.975 |
| 0.50 | 1.47730E9 | 235.118 |
| 0.75 | 1.81031E9 | 288.120 |
| 1.00 | 2.09095E9 | 332.786 |

TABLE 3b

Solutions for $\omega_{MAX}$ and $f_{MAX}$ for Case 2
(10.0 GB/s data) with allowable CNR of 48.0 dB.

| $\bar{\rho}_L$ | $\omega_{MAX}$ (rad/sec) | $f_{MAX}$ (MHz) |
|---|---|---|
| 0.25 | 9.64148E7 | 15.345 |
| 0.50 | 2.84988E8 | 45.357 |
| 0.75 | 4.48429E8 | 71.370 |
| 1.00 | 6.07378E8 | 96.667 |

Based on the relaxed CNR degradation requirements, an equalizer in Case 1 (1.25 GB/s data rates) may only use a maximum modulation bandwidth of 235.1 MHz for a polarization overlap factor of 0.5. For Case 2 (10.0 GB/s data rates) a maximum modulation bandwidth of 45.4 MHz for a polarization overlap factor of 0.5 may be used.

In other embodiments, a CNR with Raman crosstalk may only be allowed to degrade to 50.5 dB from 51 dB without interferers, or an allow degradation of only 0.5 dB (1.1220 absolute). Under these parameters, an equalizer may use the following modulation bandwidths shown in tables 4a and 4b respectively:

TABLE 4a

Solutions for $\omega_{MAX}$ and $f_{MAX}$ for Case 1
(1.25 GB/s data) with allowable CNR of 50.5 dB.

| $\bar{\rho}_L$ | $\omega_{MAX}$ (rad/sec) | $f_{MAX}$ (MHz) |
|---|---|---|
| 0.25 | 1.76623E9 | 281.104 |
| 0.50 | 2.49929E9 | 397.774 |
| 0.75 | 3.06159E9 | 487.267 |
| 1.00 | 3.53557E9 | 562.703 |

TABLE 4b

Solutions for $\omega_{MAX}$ and $f_{MAX}$ for case B
(10.0 GB/s data) with allowable CNR of 50.5 dB

| $\bar{\rho}_L$ | $\omega_{MAX}$ (rad/sec) | $f_{MAX}$ (MHz) |
|---|---|---|
| 0.25 | 4.25289E8 | 67.687 |
| 0.50 | 8.76081E8 | 139.433 |

TABLE 4b-continued

Solutions for $\omega_{MAX}$ and $f_{MAX}$ for case B
(10.0 GB/s data) with allowable CNR of 50.5 dB

| $\bar{\rho}_L$ | $\omega_{MAX}$ (rad/sec) | $f_{MAX}$ (MHz) |
|---|---|---|
| 0.75 | 1.32108E9 | 210.257 |
| 1.00 | 1.76468E9 | 280.858 |

Based on tightened CNR degradation restrictions (degradation of only 0.5 dB (1.1220 absolute)), an equalizer in Case 1 (1.25 GB/s data rates) may use a maximum modulation bandwidth of 397.8 MHz for a polarization overlap factor of 0.5. Under similar degradation restrictions, an equalizer in Case 2 (10 GB/s data rates) may use a maximum modulation bandwidth of 139.4 MHz for a polarization overlap factor of 0.5.

A total combined noise may need to be considered in order to demonstrate how an equalizer may operate to cancel out undesirable levels of Raman crosstalk noise. Using Equation 51, a total CNR on a given TV channel may be defined by:

Equation 66

$$CNR_i(\omega_M, L)_{RF} = \left[\frac{1}{CNR_{0,i}(\omega_M, L)_{RF}} + \frac{1}{CCR_i(\omega_M, L)_{RF}}\right]^{-1} \quad (66)$$

If a CNR without Raman crosstalk may be $CNR_{0,i}$ ($\omega_M$, L)$_{RF}$=51 db, a Raman CCR may need to be greater than 54.85 dB in order for a worst case combined CNR to be 49.5 dB. Similarly, a Raman CCR may need to be greater than 51.02 dB in order for a worst case combined CNR to be 48.0 dB. If a CNR without Raman crosstalk may be $CNR_{0,i}$ ($\omega_M$, L)$_{RF}$=51 db, a Raman CCR may need to be greater than 60.14 dB in order for a worst case combined CNR to be 50.5 dB. Also, an equalizer wavelength may be chosen in accordance with the first five practical choices to solving Equation 42. A mean Raman gain may be 0.1977 1/(w-km) and a wavelength having this gain may be 1577.7782 nanometers (nm) ($\lambda_E$). A mean dispersive walk off parameter may be −4.192E-10 seconds per kilometer (sec/km) and a wavelength having a walk off relative to 1555 nm may be 1577.8801 nm ($\lambda_D$). A mean value of these two wavelengths ($\lambda_E$ and $\lambda_D$) may be a chosen equalizer wavelength of 1577.8292 nm.

Figure 6A:
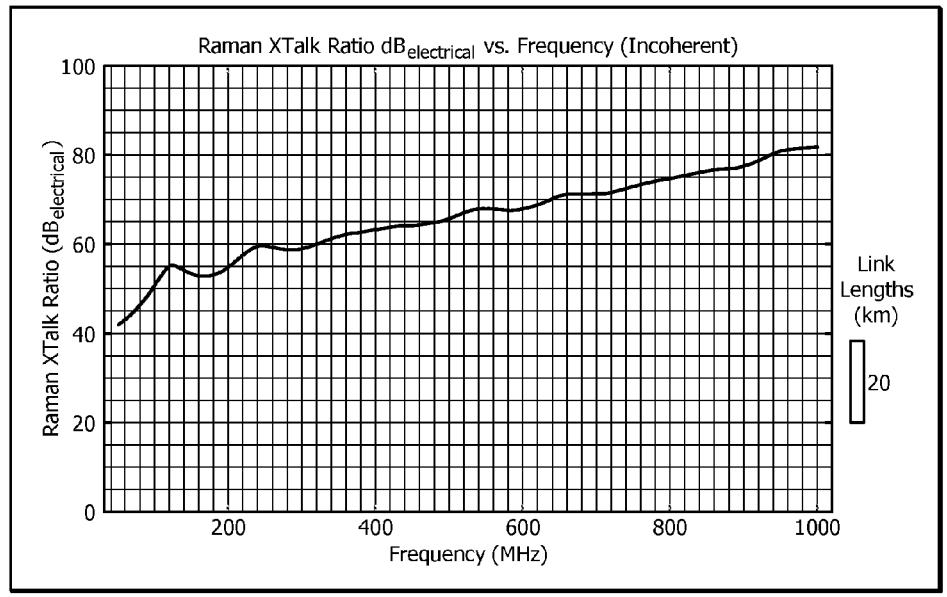
FIG. 6A is a graph of an embodiment of a Raman carrier to crosstalk noise ratio (CCR) result for an optical communication system with 1.25 Gigabits per second (Gbps) interferer data rates and no Raman crosstalk mitigation.
Figure 6B:
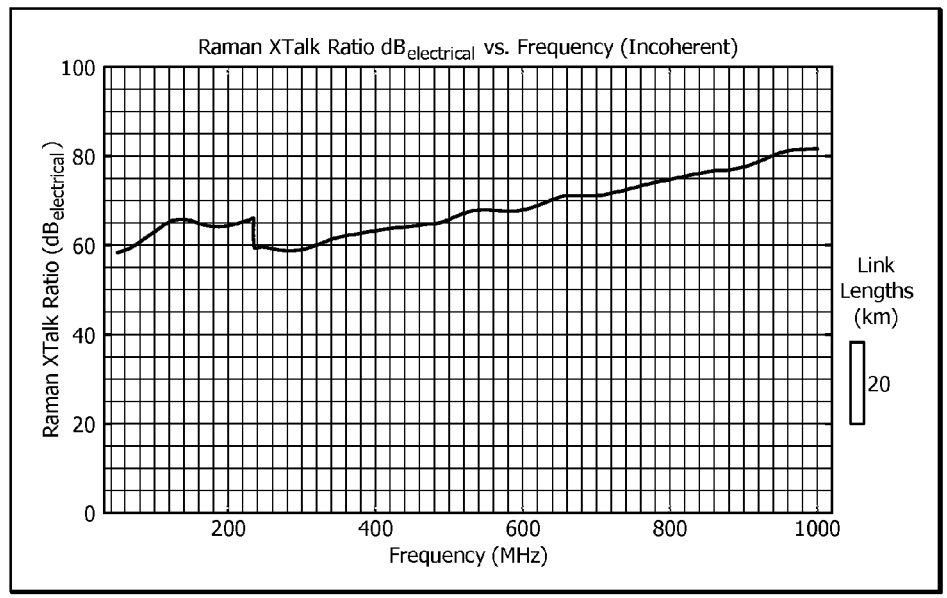
FIG. 6B is a graph of an embodiment of a CCR result for an optical communication system with 1.25 GB/s interferer data rates implementing Raman crosstalk mitigation comprising data signal samples bandwidth limited below 235.1 Megahertz (MHz).
Figure 6C:
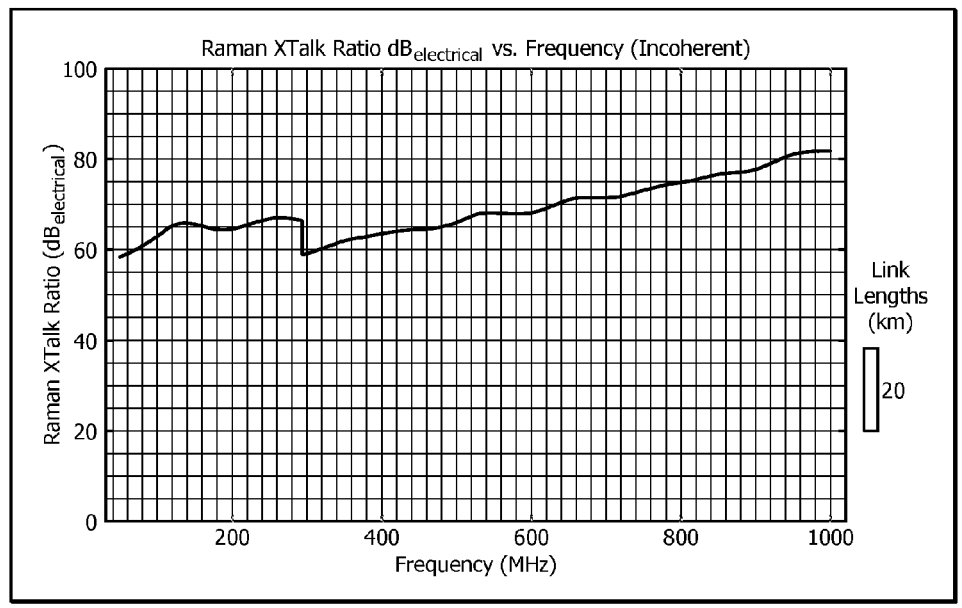
FIG. 6C is a graph of an embodiment of a CCR result for an optical communication system with 1.25 GB/s interferer data rates implementing Raman crosstalk mitigation comprising data signal samples bandwidth limited below 293.2 MHz.
Figure 6D:
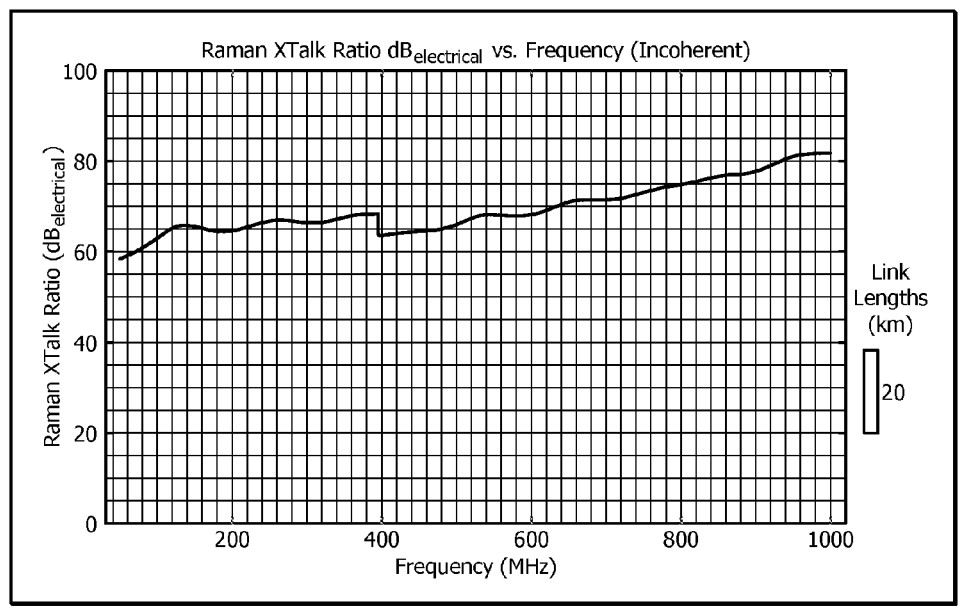
FIG. 6D is a graph of an embodiment of a CCR result for an optical communication system with 1.25 GB/s interferer data rates implementing Raman crosstalk mitigation comprising data signal samples bandwidth limited below 397.8 MHz.

FIG. 6A is a graph of an embodiment of a Raman CCR result for an optical communication system in Case 1 (e.g. 1.25 GB/s interferer data rates) with no Raman crosstalk mitigation. Similarly, FIGS. 6B through 6D are graphs of embodiments of Raman CCR results for optical communication systems in Case 1 (e.g. 1.25 GB/s interferer data rates) when a Raman crosstalk mitigation signal is applied with cutoff frequencies of 235.1 MHz, 293.2 MHz, and 397.8 MHz, respectively. These embodiments may correspond to the three examples in tables 2a, 3a, and 4a with length averaged polarization overlap values of 0.5. The x axis of FIGS. 6A-6D and FIGS. 7A-7D may represent a CCR with Raman crosstalk ratio (in dB). The y axis of FIGS. 6A-6D and FIGS. 7A-7D may represent a video stream signal center frequency (in MHz).

Figure 7A:
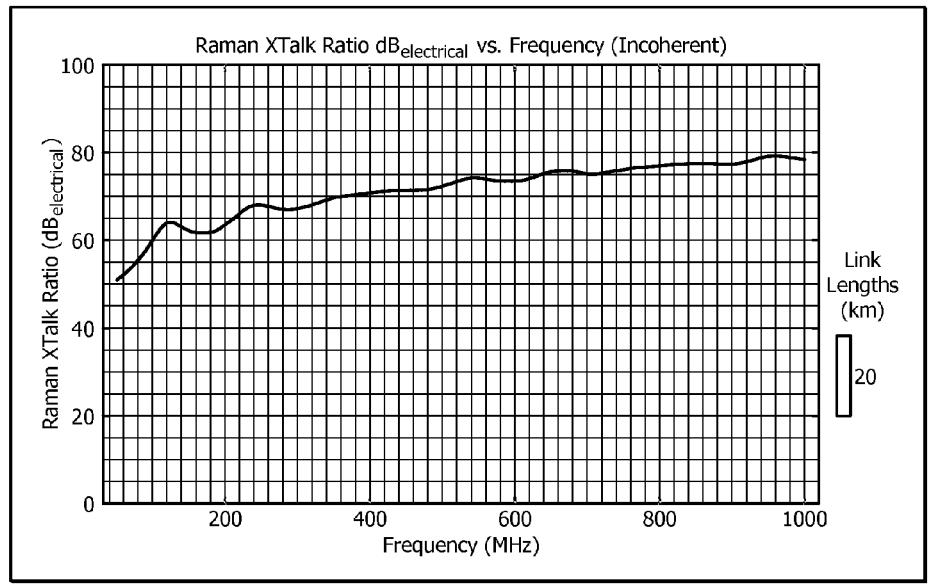
FIG. 7A is a graph of an embodiment of a CCR result for an optical communication system with 10.0 GB/s interferer data rates and no Raman crosstalk mitigation.
Figure 7B:
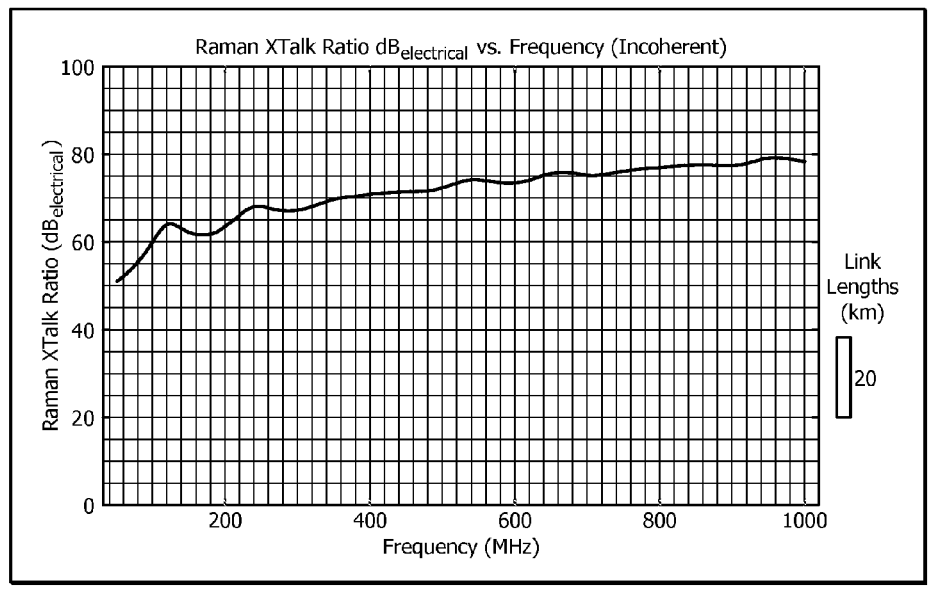
FIG. 7B is a graph of an embodiment of a CCR result for an optical communication system with 10.0 GB/s interferer data rates implementing Raman crosstalk mitigation comprising data signal samples bandwidth limited below 45.4 MHz.
Figure 7C:
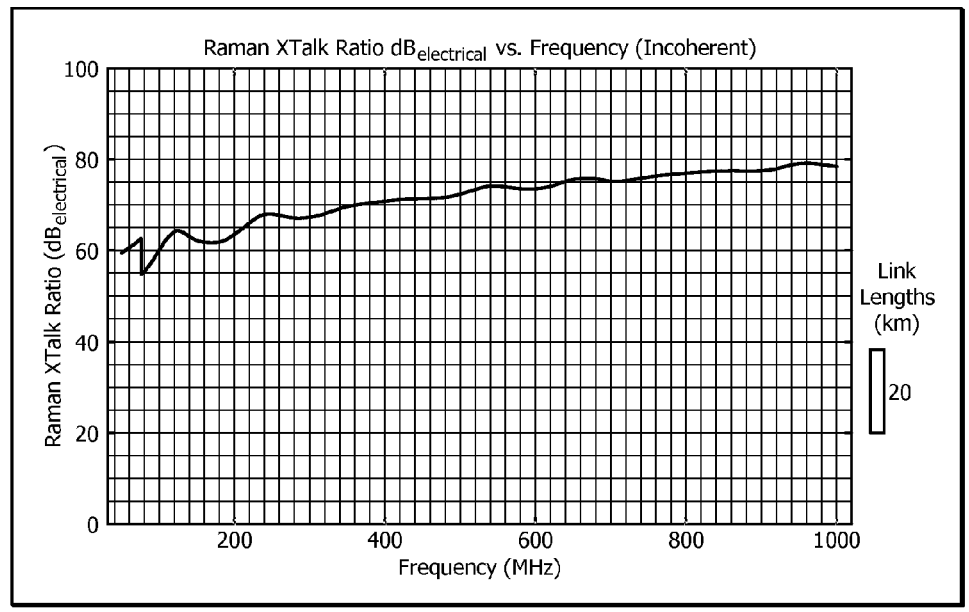
FIG. 7C is a graph of an embodiment of a CCR result for an optical communication system with 10.0 GB/s interferer data rates implementing Raman crosstalk mitigation comprising data signal samples bandwidth limited below 74.1 MHz.
Figure 7D:
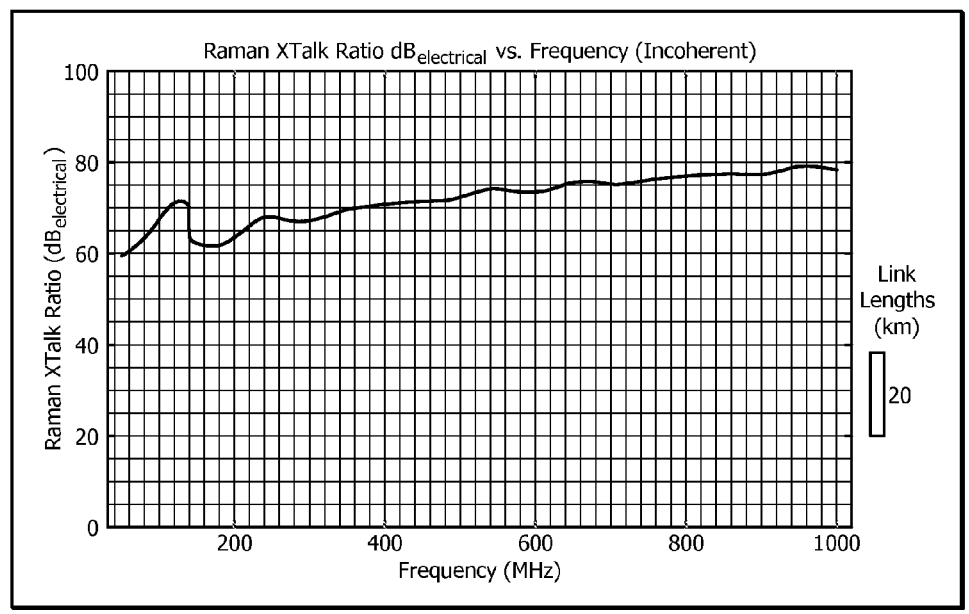
FIG. 7D is a graph of an embodiment of a CCR result for an optical communication system with 10.0 GB/s interferer data rates implementing Raman crosstalk mitigation comprising data signal samples bandwidth limited below 139.4 MHz.

FIG. 7A is a graph of an embodiment of a Raman CCR result for an optical communication system in Case 2 (e.g. 10.0 GB/s interferer data rates) with no Raman crosstalk mitigation. Similarly, FIGS. 7B through 7D are graphs of embodiments of Raman CCR results for optical communication systems in Case 2 (e.g. 10.0 GB/s interferer data rates) when a Raman crosstalk mitigation signal is applied with cutoff frequencies of 45.4 MHz, 74.1 MHz, and 139.4 MHz, respectively. These embodiments may correspond to the three examples in tables 2b, 3b, and 4b with length averaged polarization overlap values of 0.5.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.6, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical component comprising:
an interconnect configured to receive a data signal sample, wherein the interconnect is a phase matched electrical interconnect;
a Raman crosstalk equalization conditioning circuit coupled to the interconnect and configured to generate a Raman mitigation signal using the data signal sample;
a Raman equalization optical transmitter coupled to the Raman crosstalk equalization conditioning circuit and configured to convert the Raman mitigation signal into an optical Raman mitigation signal and to transmit the optical Raman mitigation signal; and
an electrical signal combiner coupled to the Raman crosstalk equalization conditioning circuit and the Raman equalization optical transmitter such that the electrical signal combiner is positioned between the Raman crosstalk equalization conditioning circuit and the Raman equalization optical transmitter,
wherein the electrical signal combiner is configured to combine the Raman mitigation signal with at least one other Raman mitigation signal received from at least one other Raman crosstalk equalization conditioning circuit.

2. The optical component of claim 1, wherein the bandwidth of the data signal sample is from about 55 Megahertz (MHz) to about 250 MHz.

3. The optical component of claim 1 further comprising a low pass filter coupled to the electrical signal combiner and the Raman equalization optical transmitter such that the low pass filter is positioned between the electrical signal combiner and the Raman equalization optical transmitter, wherein the low pass filter is configured to:
limit the bandwidth of the Raman mitigation signal; and
forward the bandwidth limited Raman mitigation signal to the Raman equalization optical transmitter.

4. The optical component of claim 1 further comprising a low pass filter coupled to the interconnect and the Raman crosstalk equalization conditioning circuit such that the low pass filter is positioned between the interconnect and the Raman crosstalk equalization conditioning circuit, wherein the low pass filter is configured to:
limit the bandwidth of the data signal sample; and
forward the bandwidth limited data signal sample to the Raman crosstalk equalization conditioning circuit.

5. The optical component of claim 4 further comprising an optical/electrical converter coupled to the interconnect and the low pass filter, wherein the optical/electrical converter is configured to:
receive the optical data sample from the interconnect; and
convert the optical data sample signal into an electrical data sample signal,
wherein the interconnect is a phase controlled optical interconnect.

6. The optical component of claim 1, wherein generating the Raman mitigation signal using the data signal sample comprises configuring the Raman mitigation signal to destructively interfere with Raman crosstalk noise induced on a video signal when a data signal associated with the data signal sample is co-propagated with the video signal through a single optical fiber.

7. A method comprising:
multiplexing a plurality of data signals with a video signal and a Raman mitigation signal; and
co-propagating the multiplexed signal on a single optical fiber,
wherein the Raman mitigation signal is selected to destructively interfere with Raman carrier to crosstalk noise induced on the video signal by the data signals.

8. The method of claim 7, wherein the data signals are incoherent data signals, and wherein the incoherent data signals do not come from a common source.

9. The method of claim 7, wherein the video signals and the data signals are analog signals.

10. The method of claim 7, wherein the video signals and the data signals are digital signals.

11. The method of claim 7 further comprising generating the Raman mitigation signal by using a sample of each of the data signals.

12. The method of claim 11, wherein the samples, the Raman mitigation signal, or combinations thereof have bandwidth from about 250 Megahertz (MHz) to about 55 Mhz.

13. A system comprising:
a video signal component configured to transmit a video signal;
a plurality of data stream signal components, wherein each data stream signal component is configured to transmit a data stream signal;
a Raman crosstalk equalization system configured to transmit a Raman mitigation signal; and
an optical multiplexer (MUX) configured to multiplex the video signal, the data stream signals, and the Raman mitigation signal onto a single transmission fiber.

14. The system of claim 13, wherein Raman crosstalk noise is induced on the video signal by the data stream signals, wherein the Raman crosstalk noise is mitigated by the Raman mitigation signal, and wherein the Raman crosstalk noise is mitigated using a single Raman equalizing laser.

15. The system of claim 14, wherein the data stream signal components are further configured to transmit the data stream signals at first powers, and wherein the Raman equalizing laser is configured to operate at a second power equal to about an average of the first powers.

16. The system of claim 13, wherein the Raman mitigation signal is generated based on bandwidth limited samples of each of the data stream signals.

17. The system of claim 16, wherein the samples, the Raman mitigation signal, or combinations thereof are bandwidth limited to about 250 Megahertz (MHz) to about 55 Mhz.

18. The system of claim 13, wherein the data stream signals are incoherent data stream signals.

* * * * *